US012674872B2

(12) United States Patent
Park et al.

(10) Patent No.: US 12,674,872 B2
(45) Date of Patent: Jul. 7, 2026

(54) LIDAR SENSOR THAT MINIMIZES NOISE LIGHT WHEN TRANSMITTING AND RECEIVING LIGHT

(71) Applicants: Yujin Robot Co., Ltd., Incheon (KR); Miele & Cie. KG, Gütersloh (DE)

(72) Inventors: Seong Ju Park, Incheon (KR); Chang Soo Kim, Incheon (KR); Jae Young Lee, Incheon (KR); Ju Young Kim, Incheon (KR); Moo Woong Cheon, Incheon (KR); Jae Guen Ko, Incheon (KR); Sang Su Cho, Incheon (KR)

(73) Assignees: Yujin Robot Co., Ltd, Incheon (KR); Miele & Cie. KG, Gütersloh (DE)

( * ) Notice: Subject to any disclaimer, the term of this patent is extended or adjusted under 35 U.S.C. 154(b) by 955 days.

(21) Appl. No.: 17/935,533

(22) Filed: Sep. 26, 2022

(65) Prior Publication Data

US 2023/0098679 A1      Mar. 30, 2023

(30) Foreign Application Priority Data

Sep. 27, 2021   (KR) ........................ 10-2021-0127260
Sep. 21, 2022   (KR) ........................ 10-2022-0119630

(51) Int. Cl.
*G01S 7/48*          (2006.01)
*G01S 7/481*         (2006.01)
(Continued)

(52) U.S. Cl.
CPC .......... *G01S 7/4868* (2013.01); *G01S 7/4817* (2013.01); *G01S 17/10* (2013.01)

(58) Field of Classification Search
None
See application file for complete search history.

(56) References Cited

U.S. PATENT DOCUMENTS 10,036,803 B2 *   7/2018   Pacala ..................... G01S 17/42
10,122,416 B2 *  11/2018   Berger ..................... H04B 5/26
(Continued)

FOREIGN PATENT DOCUMENTS

KR      10-2021-0036243 A      4/2021

OTHER PUBLICATIONS

Office Action for KR 10-2022-0119630 by Korean Intellectual Property Office dated Apr. 29, 2024.
(Continued)

*Primary Examiner* — Hovhannes Baghdasaryan
(74) *Attorney, Agent, or Firm* — BROADVIEW IP LAW, PC

(57) ABSTRACT

The present exemplary embodiments propose a LIDAR sensor including: a transmission/reception module which transmits transmission light and receives reception light reflected from an object and removes transmission light or reception light moving in a predetermined direction, a reflector assembly which has an empty space to assemble the transmission/reception module at one side, receives the transmission light from the transmission/reception module to reflect the transmission light toward the object and transmits the reception light reflected from the object to the transmission/reception module, a rotary module which is connected to a lower portion of the transmission/reception module and generates a torque to be implemented to be rotatable, and a fixing module which supports the transmission/reception module and the rotary module.

13 Claims, 32 Drawing Sheets

100

(51) Int. Cl.
  G01S 7/486 (2020.01)
  G01S 17/10 (2020.01)

(56) References Cited

U.S. PATENT DOCUMENTS

| | | | |
|---|---|---|---|
| 10,295,660 B1 * | 5/2019 | McMichael | G02B 7/005 |
| 2006/0231771 A1 * | 10/2006 | Lee | G01S 17/95 |
| | | | 250/458.1 |
| 2015/0055117 A1 * | 2/2015 | Pennecot | G01S 7/4812 |
| | | | 356/4.01 |
| 2019/0353758 A1 | 11/2019 | Shin et al. | |
| 2020/0088859 A1 | 3/2020 | Shepard et al. | |
| 2020/0142034 A1 | 5/2020 | Shepard et al. | |

OTHER PUBLICATIONS

Office Action for U.S. Appl. No. 17/935,540 by United States Patent and Trademark Office dated Oct. 20, 2025.
Office Action for U.S. Appl. No. 17/935,537 by the United States Patent and Trademark Office dated Dec. 10, 2025.

* cited by examiner

10

141

145

LAYOUT OF LIGHT RECEPTION RANGE ACCORDING
TO SIZE OF LIGHT RECEPTION UNIT PD

CROSS-SECTION A-A

CROSS-SECTION B-B

FIG. 18

LIDAR SENSOR THAT MINIMIZES NOISE LIGHT WHEN TRANSMITTING AND RECEIVING LIGHT

CROSS-REFERENCE TO RELATED APPLICATION

This application claims priority under 35 U.S.C § 119 to Korean Patent Application No. 10-2021-0127260 filed on Sep. 27, 2021, and to Korean Patent Application No. 10-2022-0119630 filed on Sep. 21, 2022, in the Korean Intellectual Property Office, the entire contents of which are hereby incorporated by reference.

BACKGROUND

Field

The present disclosure relates to a LIDAR sensor, and more particularly, to a 3D LIDAR sensor which senses a distance to a surrounding object by rotating a transmission/reception module.

Description of the Related Art

The contents described in this section merely provide background information on the present exemplary embodiment but do not constitute the related art.

A light detection and ranging (LIDAR) sensor is one of remote detection devices which irradiate light onto a subject, and then analyze light reflected from the subject to measure a physical property of the subject, for example, a distance, a speed, a temperature, a material distribution, and a concentration property.

The LIDAR sensor is used for various fields, such as autonomous vehicles, mobile robots, cleaning robots, and range finders. The LIDAR sensor has different specifications such as sizes, rotation speeds, or light sources, depending on a specification required for the applied field, but an operation principle of a rotary type LIDAR sensor is basically common.

However, in order to accurately measure a distance by means of transmitted light and received light, a time of flight which is a reciprocating time of light is used and an exact time to transmit/receive the light is necessary. However, due to noise caused by light which is scattered to be received slowly, a distortion is generated in the final distance measurement.

SUMMARY

A main object of exemplary embodiments of the present disclosure is to minimize a noise due to an optical path of transmitted or received light using a baffle to prevent light which is transmitted or received in an unwanted direction.

Other and further objects of the present disclosure which are not specifically described can be further considered within the scope easily deduced from the following detailed description and the effect.

According to an aspect of the present embodiment, the present disclosure proposes a LIDAR sensor, including a transmission/reception module which transmits transmission light and receives reception light reflected from an object and removes transmission light or reception light moving in a predetermined direction; a reflector assembly which has an empty space to assemble the transmission/reception module at one side, receives the transmission light from the transmission/reception module to reflect the transmission light toward the object and transmits the reception light reflected from the object to the transmission/reception module; a rotary module which is connected to a lower portion of the transmission/reception module and generates a torque to be implemented to be rotatable; and a fixing module which supports the transmission/reception module and the rotary module.

Desirably, the transmission/reception module includes: a first body tube which provides a path through which the transmission light moves and is assembled with a transmission lens on a front surface; a second body tube which is spaced apart from one side surface of the first body tube, provides a path through which the reception light moves, and is assembled with a reception lens on a front surface; a circuit board which is assembled on rear surfaces of the first body tube and the second body tube, transmits the transmission light and receives the reception light to acquire distance information to the object; and a baffle which is assembled on one side surfaces of the first body tube and the second body tube and cancels a noise due to the transmission light and the reception light.

Desirably, the baffle includes: a light transmission baffle which is assembled on the first body tube and has at least one groove through which the transmission light passes; and a light reception baffle which is assembled on the second body tube and has at least one groove through which the reception light passes; and the baffle is slidably assembled in assembly grooves formed on lower side surfaces of the first body tube and the second body tube.

Desirably, the light transmission baffle includes: a first light transmission assembly unit including a first light transmission groove; and a second light transmission assembly unit including a second light transmission groove which is formed to have smaller area than that of the first light transmission groove and is assembled on the first body tube such that the first light transmission assembly unit is disposed in front of the second light transmission assembly unit.

Desirably, the first light transmission groove and the second light transmission groove are implemented to form an inclination as a diameter increases toward the transmission lens so as to move the transmission light only in a predetermined direction and the first light transmission groove is formed to be rounded or inclined by obliquely chamfering an edge or a corner.

Desirably, the light reception baffle includes a light reception assembly unit including a light reception groove and a bandpass filter which is assembled on the second body tube to be disposed to be spaced apart from a rear end of the light reception assembly unit and passes only the reception light having a predetermined frequency component, and the light reception groove is implemented to form an inclination as a diameter increases toward the reception lens so as to move the reception light only in a predetermined direction.

Desirably, the light reception assembly unit is designed to have a predetermined size according to a light reception range of the reception light and a step-shaped inclination is formed in a direction where the circuit board is provided or the light reception lens is provided with respect to the light reception groove formed to be spaced apart from the circuit board and a distance between the light reception groove and the circuit board is 7 mm to 9 mm.

Desirably, the light transmission baffle includes a plurality of light transmission assembly units including light transmission grooves and the plurality of light transmission assembly units is assembled to be located on the first body tube in one line, and the light reception baffle includes a plurality of light reception assembly units which forms light reception grooves and the plurality of light reception assembly units is assembled to be located on the second body tube in one line.

Desirably, the transmission/reception module further includes: a shielding unit which encloses at least one side surface of the first body tube or the second body tube which forms a plurality of grooves to assemble the baffle according to a viewing angle of the transmission light and the reception light, and the shielding unit encloses the first body tube or the second body tube to be spaced apart from at least one side surface with a predetermined distance and limits transmitted or received light from moving to the outside along a groove which is not assembled with the baffle, among the plurality of grooves.

Desirably, the second body tube includes: an absorber disposed in a groove formed in a length direction between the baffle and the reception lens, and the absorber absorbs light which moves in a direction in which the absorber is formed, among received light.

Desirably, the reflector assembly includes: a mirror housing in which the transmission/reception module is assembled on one lower side; a first reflection unit which is provided at one lower side of the mirror housing so as to correspond to the transmission/reception module; a mirror holder unit which is assembled in an assembly groove formed on the mirror housing to be fixed to the mirror housing; a mirror driving unit which provides a rotary driving force to the mirror holder unit to adjust a reflection direction of the second reflection unit; and a second reflection unit which is fixed to one side surface of the mirror holder unit to rotate by the operation of the mirror holder unit and reflects the transmission light toward the object and receives reception light reflected from the object.

Desirably, the mirror holder unit includes: bearings which are assembled on both ends of the mirror holder unit in a state in which the mirror holder unit is assembled in the assembly groove of the mirror housing to be assembled in the mirror housing to be fixed; a second gear which is assembled at the outside of the bearing to be fixed; and a fixing ring which is assembled to abut with the outside of the second gear to fix the second gear, and the second gear and the fixing ring are assembled only at one end of one of the bearings assembled at both ends to be fixed.

Desirably, the mirror driving unit includes a first gear which is connected to the second gear, limits an angle range at which the mirror holder unit rotates as the mirror driving unit rotates in a first direction or a second gear within a predetermined angle range by the first gear, and supplies a rotary driving force to the mirror holder unit to rotate the second reflection unit fixed to the mirror holder unit, and a rotation axis of the mirror driving unit and a rotation axis of the mirror holder unit are assembled in the mirror housing to correspond to each other.

Desirably, the first reflection unit receives the transmission light by means of the transmission/reception module to transmit the transmission light to the second reflection unit and receives the reception light by means of the second reception unit to transmit the reception light to the transmission/reception module.

According to still another aspect of the present embodiment, the present disclosure proposes a moving body including: a LIDAR sensor which transmits transmission light and receives reception light and removes transmission light or reception light moving in a predetermined direction; and a moving device which is implemented to move the moving object based on the distance, and the LIDAR sensor includes: a transmission/reception module which transmits transmission light and receives reception light reflected from an object and removes transmission light or reception light moving in a predetermined direction; a reflector assembly which has an empty space to assemble the transmission/reception module at one side, receives the transmission light from the transmission/reception module to reflect the transmission light toward the object and transmits the reception light reflected from the object to the transmission/reception module; a rotary module which is connected to a lower portion of the transmission/reception module and generates a torque to be implemented to be rotatable; and a fixing module which supports the transmission/reception module and the rotary module.

As described above, according to the exemplary embodiments of the present disclosure, the present disclosure may increase the accuracy of calculating a ToF by reducing a noise included in light which is incident onto a second body tube.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIGS. 17 and 18 are experimental results illustrating a reflection light path according to a structure of a light transmitter/receiver module according to an exemplary embodiment.

DETAILED DESCRIPTION OF THE EMBODIMENT

Figure 1:
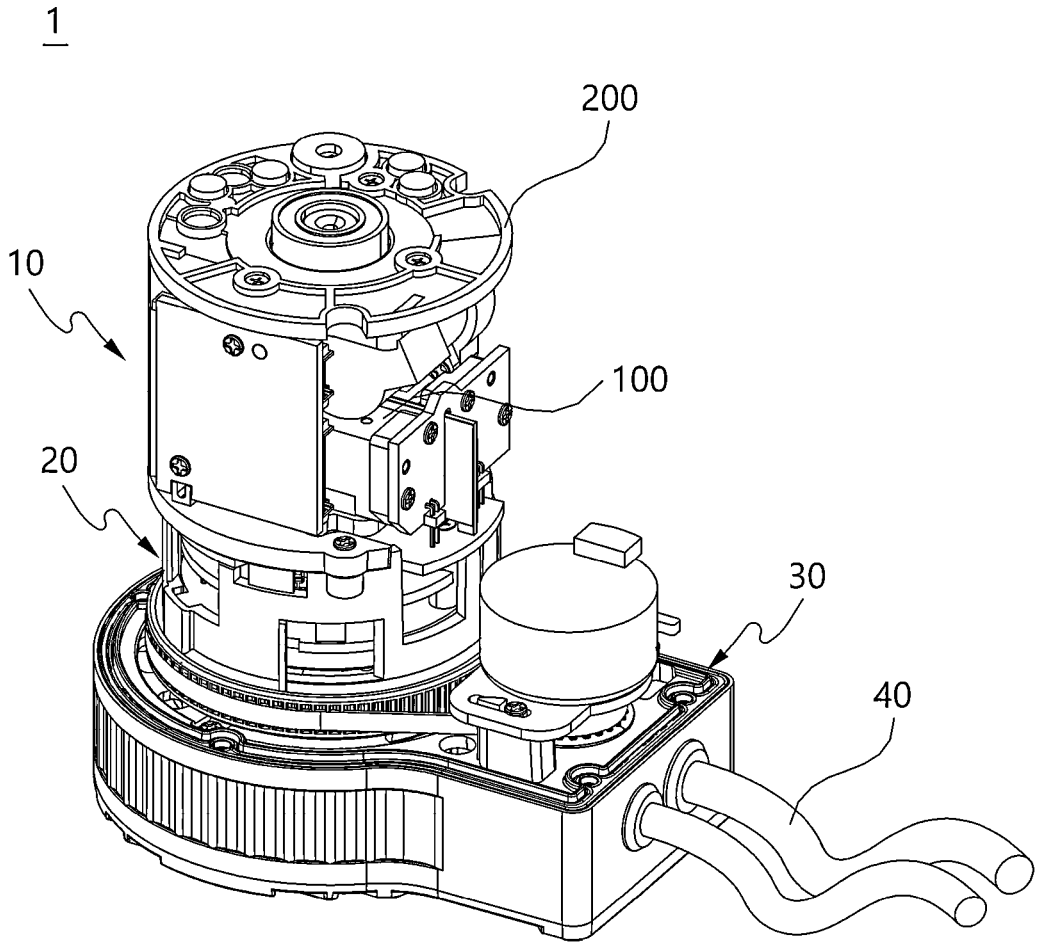
FIGS. 1 and 2 are views illustrating an internal configuration of a LIDAR sensor according to an exemplary embodiment of the present disclosure.

Hereinafter, embodiments of the present invention will be described in detail with reference to the accompanying drawings. Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

Terms used in the present application are just used to describe a specific exemplary embodiment and do not intend to limit the present invention and a singular expression may include a plural expression as long as it is not apparently contextually different. In the present application, it should be understood that the term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

Terms including an ordinary number, such as first and second, are used for describing various constituent elements, but the constituent elements are not limited by the terms. The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

The present disclosure relates to a LIDAR sensor.

The LIDAR sensor according to the present exemplary embodiment may be applied to a distance measuring apparatus or a moving object. That is, the LIDAR sensor may be applied to products which require distance measurement, such as small appliances or a moving object such as drones or vehicles. The moving object includes a LIDAR sensor and a moving device. The moving object includes robot cleaners, logistics robots, toy cars, mobile robots for industrial or military purposes.

The LIDAR sensor is a device which transmits a laser signal, measures a returning time of the reflected signal, and measures a distance to a reflector using a speed of light. The laser signal is converted into an electrical signal by a photo diode. The laser signal may have a predetermined wavelength band.

The Lidar sensor may operate by a time of flight (TOF) manner to measure a distance. According to the time of flight manner, a laser emits a pulsed or square wave signal to measure a time when reflection pulses or square wave signals from objects within a measurement range reach a receiver to measure a distance between an object to be measured and the distance measuring device.

Figure 2:
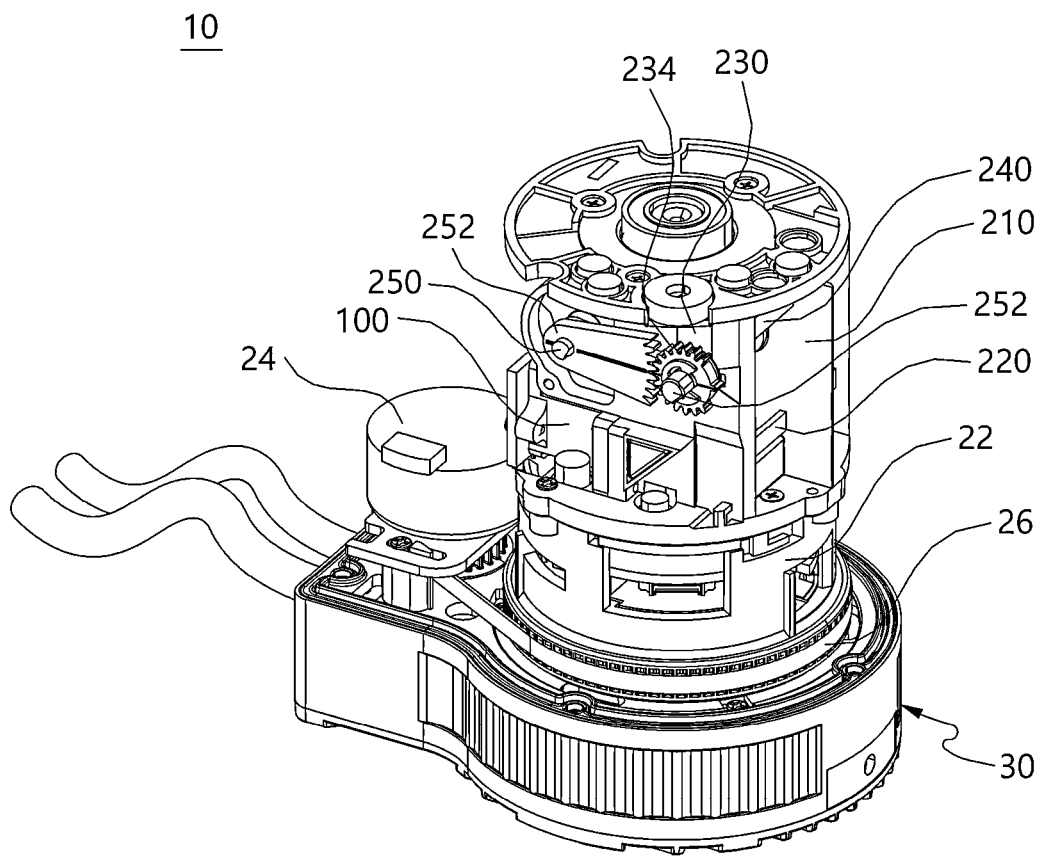

FIGS. 1 and 2 are views illustrating an internal configuration of a LIDAR sensor according to an exemplary embodiment of the present disclosure.

Referring to FIGS. 1 and 2, the LIDAR sensor 1 includes a light transceiver 10, a rotary module 20, and a fixing module 30. The LIDAR sensor 1 may omit some components among various components which are exemplarily illustrated in FIGS. 1 and 2 or may additionally include other component.

The light transceiver 10 transmits transmission light and receives reception light reflected from an object and removes transmission light or reception light moving in a predetermined direction.

The light transceiver 10 includes a transmission/reception module 100 and a reflector assembly 200.

The transmission/reception module 100 transmits transmission light by means of a light source and receives reception light reflected from an object.

The transmission/reception module 100 includes a first body tube 110, a second body tube 120, a circuit board 130, and a baffle 140.

The first body tube 110 provides a path through which the transmission light moves and includes a transmission lens 112 assembled on a front surface.

The transmission lens 112 may be longitudinally formed, but is not necessarily limited thereto.

The second body tube 120 is disposed to be spaced apart from one side surface of the first body tube 110, provides a path through which the reception light moves, and a reception lens 122 may be assembled on a front surface thereof.

The reception lens 122 may be laterally formed, but is not necessarily limited thereto.

The second body tube 120 may further include an absorber 128.

The absorber 128 may be formed in a groove formed between the baffle 140 and the lens assembled on the front surface.

The absorber 128 may absorb light which moves in a direction in which the absorber 128 is formed, among received light.

According to still another exemplary embodiment of the present disclosure, the absorber 128 may be applied not only to the second body tube 120, but also to the first body tube 110.

The circuit board 130 is assembled on rear surfaces of the first body tube 110 and the second body tube 120 and transmits transmission light and receives reception light to acquire distance information to the object.

The baffle 140 is assembled on one side surfaces of the first body tube 110 and the second body tube 120 and cancels noises caused by the transmission light and the reception light.

The baffle 140 includes a light transmission baffle 141 and a light reception baffle 145.

The baffle 140 is slidably assembled in assembly grooves formed on lower side surfaces of the first body tube 110 and the second body tube 120.

The light transmission baffle 141 is assembled on the first body tube 110 and has at least one groove through which the transmission light passes.

The light transmission baffle 141 includes a first light transmission assembly unit 142 and a second light transmission assembly unit 144.

The first light transmission assembly unit 142 includes a first light transmission groove.

The second light transmission assembly unit 144 includes a second light transmission groove.

The first light transmission groove and the second light transmission groove may be implement to form an inclination as a diameter is increased toward the transmission lens so that the transmission light moves only in a predetermined direction. The first transmission groove is formed to be rounded or inclined by obliquely chamfering an edge or a corner.

The light transmission baffle 141 may be assembled on the first body tube 110 so that the first light transmission assembly unit 142 is disposed on the front of the second light transmission assembly unit 144.

The first light transmission groove may be formed to have a larger size than the second light transmission groove.

The light reception baffle 145 is assembled on the second body tube 120 and has at least one groove through which the reception light passes.

The light reception baffle 145 includes a light reception assembly unit 146 and a bandpass filter 148.

The light reception assembly unit 146 may include a light reception groove.

The light reception groove may be implemented to form an inclination as the diameter is increased toward the reception lens 122 so that the reception light moves only in the predetermined direction.

The light reception assembly unit 146 is designed to have a predetermined size according to a light reception range of the reception light and a step-shaped inclination is formed in a direction where the circuit board 130 is provided or the light reception lens is provided with respect to the light reception groove formed to be spaced apart from the circuit board 130. At this time, a distance between the light reception groove and the circuit board 130 may be 7 mm to 9 mm.

According to the exemplary embodiment of the present disclosure, an inclined surface may be implemented such that a diameter is increased toward a direction where the circuit board 130 is provided with respect to the light reception groove, a diameter is increased toward a direction where the light reception lens is provided, and a descending step-shaped inclination may be implemented. At this time, the received reception light may pass through the light reception groove along the step shaped inclination to be transmitted to the circuit board 130.

The light transmission baffle 141 includes a plurality of light transmission assembly units including light transmission grooves and is assembled such that the plurality of light transmission assembly units is located on the first body tube 110 in one line. The light reception baffle 145 includes a plurality of light reception assembly units including light reception grooves and is assembled such that the plurality of light reception assembly units is located on the second body tube 110 in one line.

According to the exemplary embodiment of the present disclosure, as the plurality of light transmission grooves (apertures) or light reception grooves (apertures), it is easy to suppress light in an undesired direction and the surface may be formed with an uneven surface as rough as possible.

The bandpass filter 148 is assembled on the second body tube 120 to be spaced apart from at a rear end of the light reception assembly unit 146 and passes only reception light having a predetermined frequency component.

The reflector assembly 200 forms an empty space to assemble the transmission/reception module 100 at one side, receives the transmission light from the transmission/reception module 100 to reflect the transmission light toward the object and transmits the reception light reflected from the object to the transmission/reception module 100.

The reflector assembly 200 includes a mirror housing 210, a first reflection unit 220, a mirror holder unit 230, and a second reflection unit 240.

The mirror housing 210 may be assembled at one lower side of the transmission/reception module 100.

The first reflection unit 220 may be provided in a position corresponding to the transmission/reception module 100 at one lower side of the mirror housing 210.

The first reflection unit 220 receives the transmission light by means of the transmission/reception module 100 to transmit the transmission light to the second reflection unit 240 and receives the reception light by means of the second reflection light 240 to transmit the reception light to the transmission/reception module 100.

The mirror holder unit 230 is assembled in an assembly groove formed at an upper end of the mirror housing 210 to be fixed to the mirror housing 210.

The mirror holder unit 230 includes a bearing 232, a second gear 234, and a fixing ring 236.

The bearing 232 is assembled on both ends of the mirror holder unit 230 in a state in which the mirror holder unit 230 is assembled in the assembly groove of the mirror housing 210 to be assembled and fixed to the mirror housing 210.

The second gear 234 may be assembled and fixed to the outside of the bearing.

The fixing ring 236 is assembled to abut with the outside of the second gear 234 to fix the second gear 234.

The second gear 234 and the fixing ring 236 may be assembled only at an end of one of the bearings 232 assembled to both ends to be fixed.

The second reflection unit 240 is fixed to one side surface of the mirror holder unit 230 to rotate by the operation of the mirror holder unit 230 and reflects the transmission light toward the object and receives the reception light reflected from the object.

The reflector assembly 200 further includes a mirror driving unit 250.

The mirror driving unit 250 provides a rotary driving force to the mirror holder unit 230 to adjust a reflection direction of a second reflection unit 240.

The mirror driving unit 250 includes a first gear 252 connected to the second gear 234 and provides a rotary driving force to the mirror holder unit 230 by means of the first gear 252 to rotate the second reflection unit 240 fixed to the mirror holder unit 230.

The first gear 252 limits the angle range at which the mirror holder unit 230 rotates as it rotates in a first direction or a second direction within a predetermined angle range.

A rotation axis of the mirror driving unit 250 and a rotation axis of the mirror holder unit 230 are assembled in the mirror housing 210 to correspond to each other.

The rotary module 20 is connected to the lower portion of the light transceiver 10 and generates a torque to be rotatably implemented.

The fixing module 30 supports the transmission/reception module 100, the reflector assembly 200, and the rotary module 20.

Referring to FIG. 1, the cable 40 is connected at one side surface of the fixing module 30. The cable 40 includes an MCU and WPT TX part and is implemented to supply the power to the upper part by a motor driving function and other function and wireless power function. Further, the cable 40 transmits space measurement information (range, intensity, horizontal/vertical angle) of the LIDAR sensor 1 to the outside via the Ethernet communication.

Figure 3:
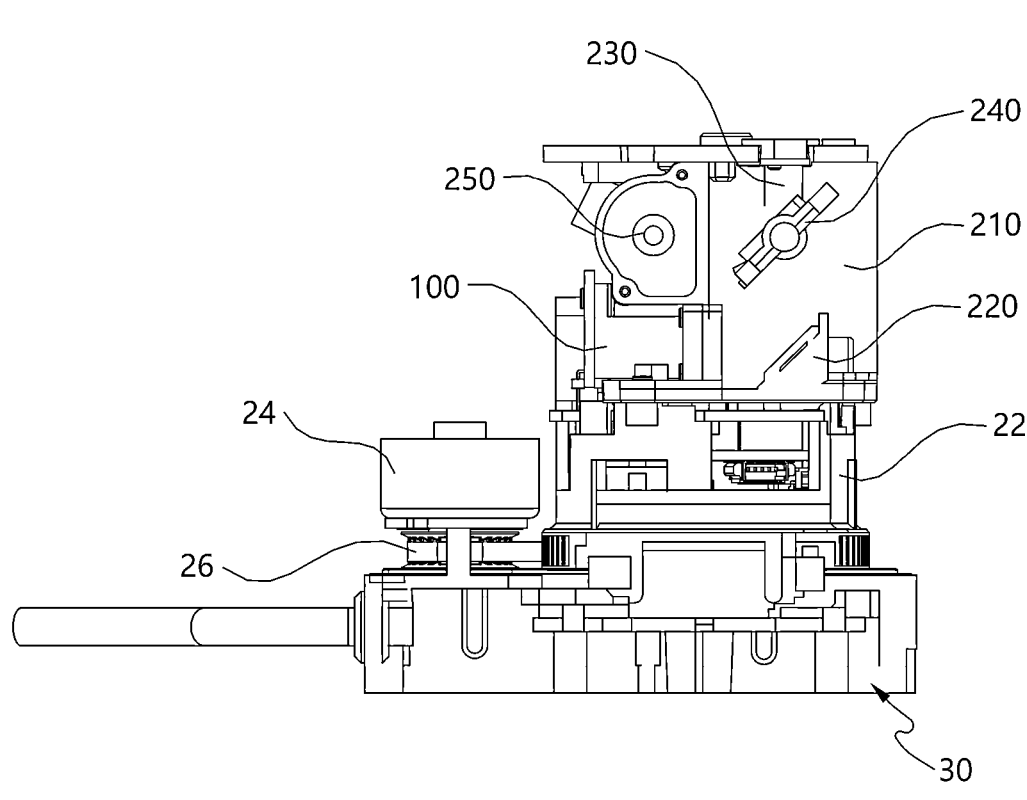
FIG. 3 is a view illustrating a side surface of a LIDAR sensor according to an exemplary embodiment of the present disclosure.

FIG. 3 is a view illustrating a side surface of a LIDAR sensor according to an exemplary embodiment of the present disclosure.

The LIDAR sensor 1 includes a light transceiver 10 provided above a rotary module 20 and the fixing module 30 provided at a lower end to perform the operation.

Referring to FIG. 3, the rotary module 20 includes a rotary unit 22, a rotary driving unit 24, and a rotary connection unit 26.

The rotary unit 22 rotates with the light transceiver 10 attached thereto.

The rotary module 20 transmits the rotary driving force generated by the rotary driving unit 24 to the rotary unit 22 by means of the rotary connection unit 26 to rotate the rotary unit 22.

According to the exemplary embodiment of the present disclosure, the rotary connection unit 26 may be used to transmit the rotary driving force at a predetermined rotation ratio.

The LIDAR sensor 1 rotates the rotary driving unit 24 to rotate a pulley and a belt 26 is supplied with a power by means of the pulley to rotate the rotary module 20.

The fixing module 30 supports the light transceiver 10 and the rotary module 20.

The transmission/reception module 100 may be fixed in a location spaced apart from the reflector assembly 200 with a predetermined distance. For example, the transmission/reception module 100 is assembled in an empty space on one lower side surface of the reflector assembly 200 and at least partially abuts or does not abut. Specifically, the transmission/reception module 100 may be implemented in a location to interact with the first reflection unit 220 of the reflector assembly 200 by means of the transmission light or the reception light.

Referring to FIG. 3, the transmission/reception module 100 is located in a location corresponding to the first reflection unit 220 of the reflector assembly 200 to transmit the transmission light to the first reflection unit 220 and receive the reception light transmitted to the first reflection unit 220.

The second reflection unit 240 may be provided in the corresponding location to interact with the first reflection unit 220. For example, the second reflection unit 240 is located in a location to receive the transmission light reflected from the first reflection unit 220 and to reflect the light toward the object.

Referring to FIG. 3, the second reflection unit 240 may be fixed in a location spaced apart from the upper end of the first reflection unit 220 and may be implemented to control the direction.

According to an exemplary embodiment of the present disclosure, the second reflection unit 240 may be provided in one line with the mirror driving unit 250. Specifically, an axis center of the mirror holder unit 230 to which the second reflection unit 240 is fixed and an axis center of the mirror driving unit 250 are implemented to be located on one line, but are not necessarily limited thereto.

The mirror driving unit 250 may be connected to the mirror holder unit 230 by means of the first gear 252.

Specifically, the first gear 252 may be assembled to abut with the second gear 234 assembled in the mirror holder unit 230 and rotates by the mirror driving unit 250 to rotate the second gear 234. Accordingly, the mirror holder unit 230 rotates to rotate the second reflection unit 240 fixed to the mirror holder unit 230.

According to an exemplary embodiment of the present disclosure, the first gear 252 may rotate in a first direction or a second direction with a predetermined angle range by the mirror driving unit 250 and also rotates an engaged second gear 234 in the first direction or the second direction. By doing this, the second reflection unit 240 may rotate in the first direction or the second direction within the predetermined angle direction. Here, the predetermined angle may be determined according to a tooth ratio of the first gear 252 and the second gear 234. The number of teeth of the first gear 252 and the number of teeth of the second gear 234 are set to M to N (here, M and N are natural numbers) to adjust a movement speed of the second reflection unit 240 assembled in the mirror holder unit 230 according to a rotation speed of the mirror driving unit 250.

In the reflector assembly 200, as the mirror driving unit 250 rotates, the mirror holder unit 230 rotates. At this time, the mirror driving unit 250 and the mirror holder unit 230 may vertically rotate, but are not necessarily limited thereto.

Accordingly, the LIDAR sensor 1 allows light which is not vertically transmitted/received to go out from the first body tube 110 and the second body tube 120 so that finally, the reception light is not contaminated.

Figure 4:
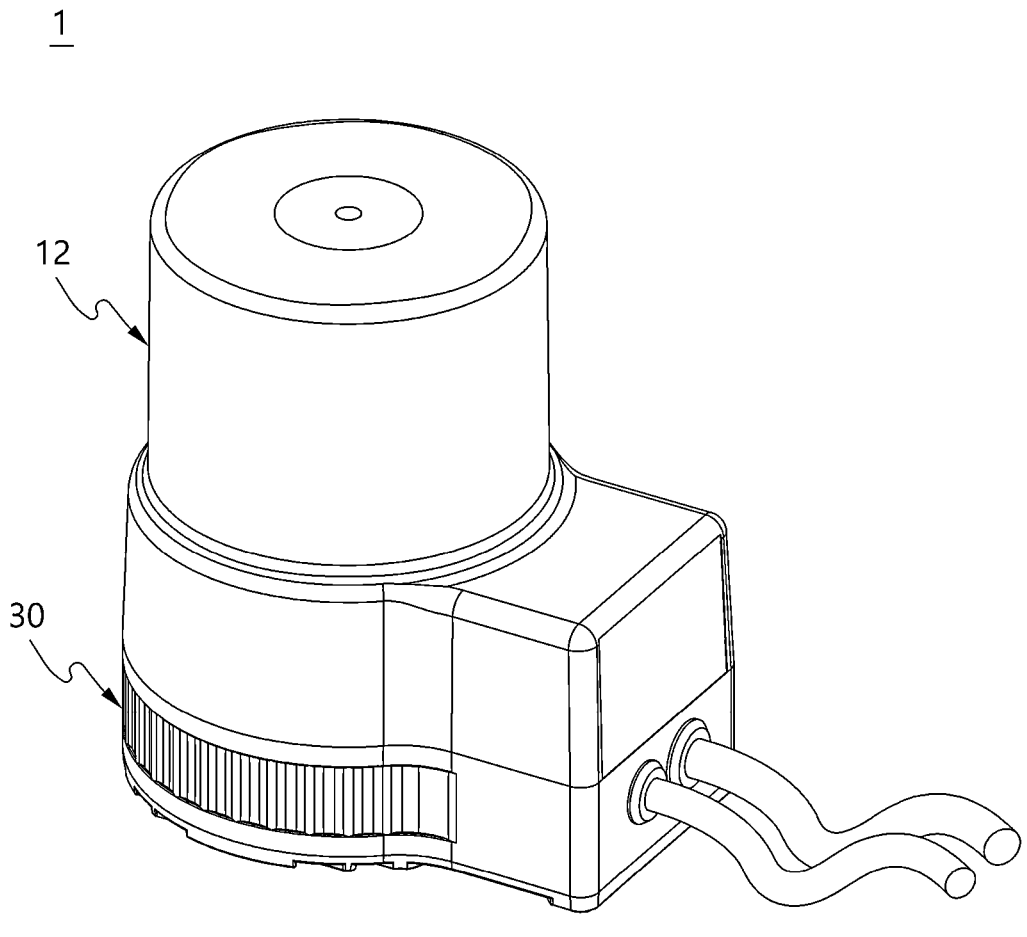
FIG. 4 is a view illustrating an external shape of a LIDAR sensor according to an exemplary embodiment of the present disclosure.

FIG. 4 is a view illustrating an external shape of a LIDAR sensor according to an exemplary embodiment of the present disclosure.

Referring to FIG. 4, the LIDAR sensor 1 further includes a protection housing 12 to protect the light transceiver 10 and the rotary module 20 from the outside.

The protection housing 12 may be implemented to enclose the light transceiver 10 and the rotary module 20 to be provided inside at an upper end of the fixing module 30, but is not necessarily limited thereto.

Figure 5:
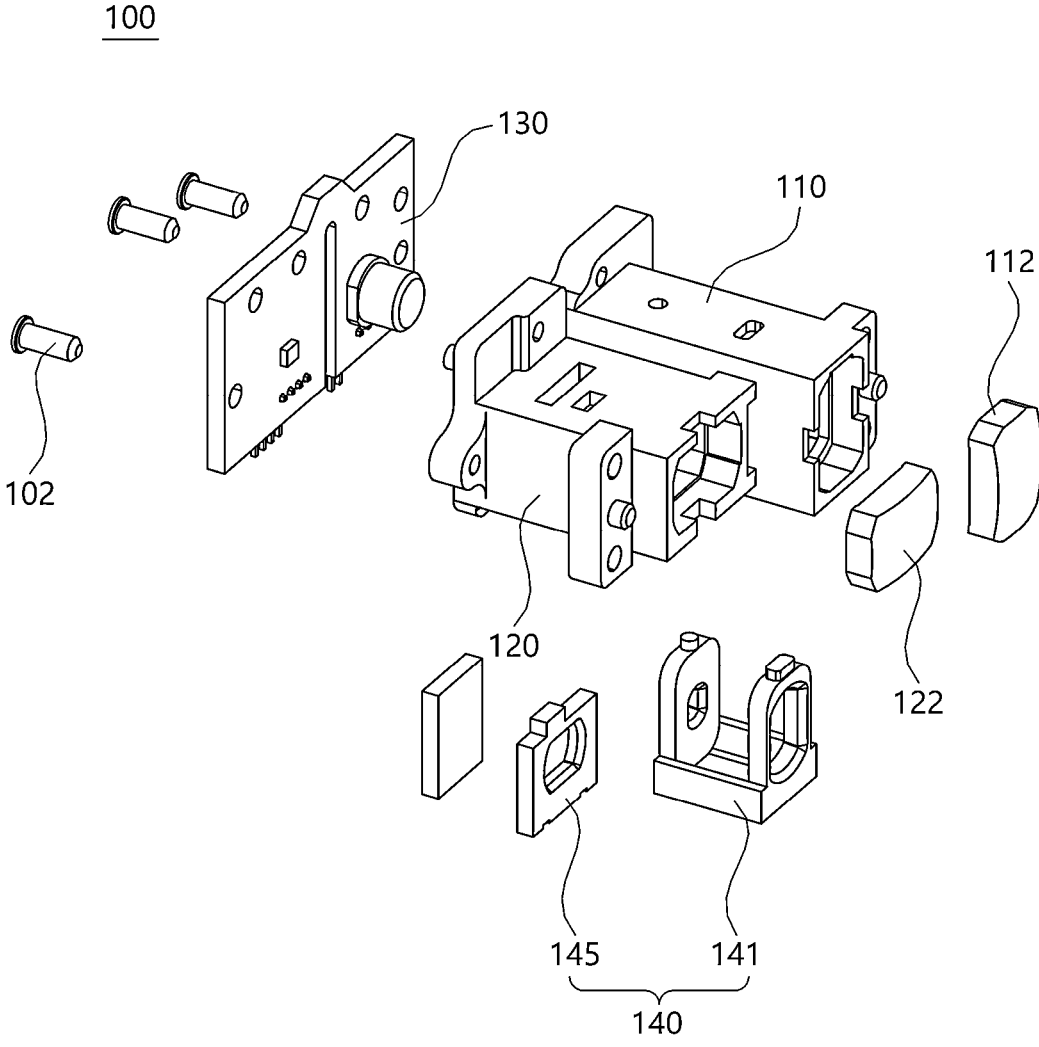
FIG. 5 is a view illustrating a transmission/reception module according to an exemplary embodiment of the present disclosure.

FIG. 5 is a view illustrating a transmission/reception module according to an exemplary embodiment of the present disclosure.

The transmission/reception module 100 of the light transceiver 10 of the LIDAR sensor 1 may be implemented with a body tube structure which removes light which travels in an unwanted place when light is transmitted/received.

According to one exemplary embodiment of the present disclosure, the transmission/reception module 100 includes one first body tube 110 and one second body tube 120, but is not necessarily limited thereto.

The first body tube 110 and the second body tube 120 may be provided in a horizontally corresponding location and lenses are assembled on front surfaces and circuit boards 130 may be assembled on rear surfaces. For example, the first body tube 110 and the second body tube 120 are screwed to be assembled and fixed with the circuit boards 130 by means of a screw 102 and the lenses are assembled in grooves formed on the front surfaces and then bonded to be fixed.

The circuit board 130 may include a light source in a location corresponding to the first body tube 110. The light source transmits transmission light to pass through the first body tube 110 and transmit the light toward the object by means of the reflector assembly 200.

The circuit board 130 receives reception light in a position corresponding to the second body tube 120 to acquire distance information of the object.

According to the exemplary embodiment of the present disclosure, the circuit board 130 may calculate an output of a light source, a pulse repetitive rate, and distance information to the object.

The circuit board 130 may include an emitter 132, a detector 134, and a ground 136, but is not necessarily limited thereto.

The emitter 132 transmits transmission light and is assembled with the first body tube 110 to transmit the transmission light along a path formed by the first body tube 110.

The detector 134 receives reception light and is assembled with the second body tube 120 to receive the received reception light along a path formed by the second body tube 120.

A plurality of grounds 136 is formed at lower ends of the emitter 132 and the detector 134, but is not necessarily limited thereto.

The baffle 140 is slidably assembled on lower surfaces of the first body tube 110 and the second body tube to be fixed, but is not necessarily limited thereto.

The baffle 140 is detachably implemented to be separated from the first body tube 110 and the second body tube 120.

The transmission/reception module 100 may be implemented with a structure in which a light transmission lens 112, a light reception lens 122, a circuit board 130, and a baffle 140 are assembled to be fitted into the grooves of the first body tube 110 and the second body tube 120. Specifically, the light transmission lens 112 and the light reception lens 122 are assembled in front grooves of the first body tube 110 and the second body tube 120 and then bonded to be fixed. Further, the circuit board 130 is screwed to be assembled and fixed to the rear surfaces of the first body tube 110 and the second body tube 120.

Accordingly, the transmission/reception module 100 optimizes the position of the baffle 140 to prevent the light reception in an undesired direction and minimizes a size of a hole of the baffle 140 and changes a shape of the baffle 140 to minimize the noise.

Figure 6A:
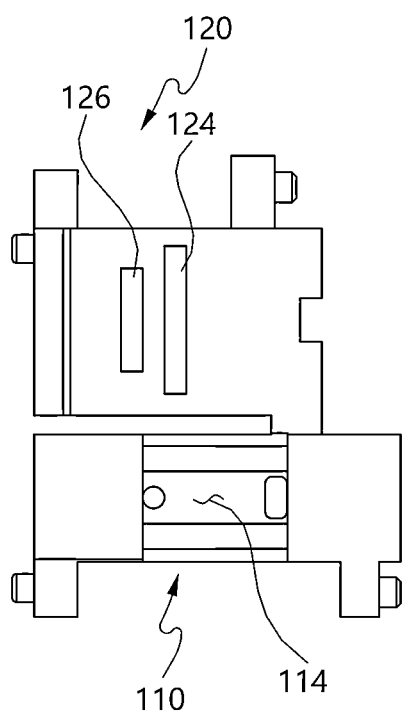
FIGS. 6A and 6B are a view illustrating a first body tube and a second body tube of a transmission/reception module according to an exemplary embodiment of the present disclosure.
Figure 6B:
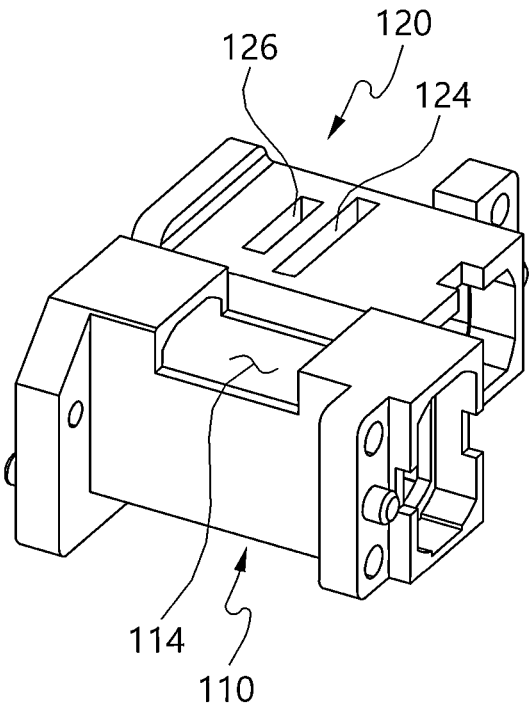

FIG. 6 is a view illustrating a first body tube and a second body tube of a transmission/reception module according to an exemplary embodiment of the present disclosure.

The first body tube 110 and the second body tube 120 include assembly grooves to which the baffle 140 is fixed, on lower surfaces. Specifically, the first body tube 110 includes a light transmission assembly groove 114 and the second body tube 120 includes a first light reception assembly groove 124 and a second light reception assembly groove 126.

The light transmission assembly groove 114 is a groove to which the light transmission baffle 141 including a light reception assembly unit 146 and the bandpass filter 148 is assembled to be fixed and is formed with the same shape as the outside of the light transmission baffle 141.

The first light reception assembly groove 124 is a groove to which the first light reception assembly unit 146 is assembled to be fixed and is formed with the same shape as the outside of the first light reception assembly unit 146.

The second light reception assembly groove 126 is a groove to which the bandpass filter 148 is assembled to be fixed and is formed with the same shape as the outside of the bandpass filter 148.

FIG. 7 is a view illustrating a baffle of a transmission/reception module according to an exemplary embodiment of the present disclosure.

Figure 7A:
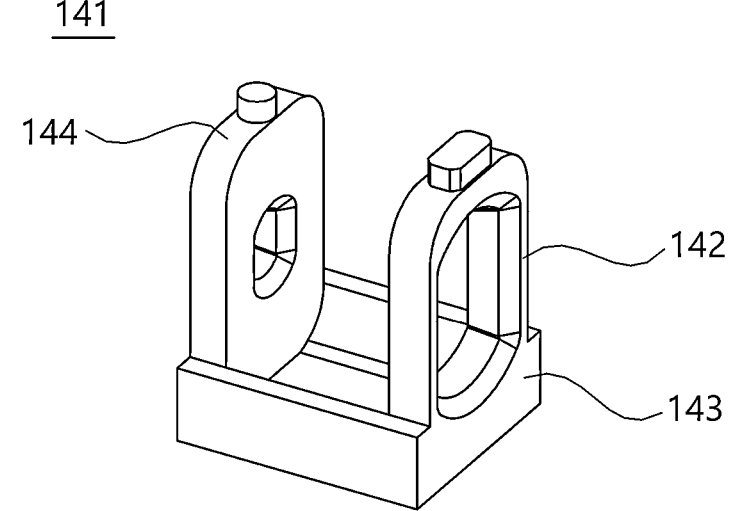
FIGS. 7A and 7B are a view illustrating a baffle of a transmission/reception module according to an exemplary embodiment of the present disclosure.
Figure 7B:
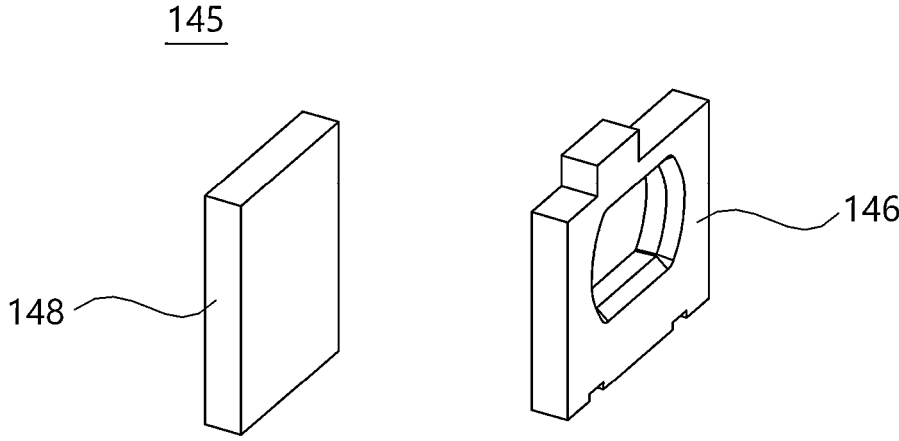

FIG. 7A is a view illustrating a light transmission baffle according to an exemplary embodiment of the present disclosure and FIG. 7B is a view illustrating a light reception baffle according to an exemplary embodiment of the present disclosure.

Referring to FIG. 7A, the light transmission baffle 141 includes a first light transmission assembly unit 142 and a second light transmission assembly unit 144. Specifically, the light transmission baffle 141 is implemented such that the first light transmission assembly unit 142 and the second light transmission assembly unit 144 are spaced apart from each other and further includes a baffle connection unit 143 connecting the first light transmission assembly unit 142 and the second light transmission assembly unit 144.

According to the exemplary embodiment of the present disclosure, it is illustrated that the light transmission baffle 141 includes the baffle connection unit 143 connecting the first light transmission assembly unit 142 and the second light transmission assembly unit 144, but is not necessarily limited thereto. The first light transmission assembly unit 142 and the second light transmission assembly unit 144 are separated from each other to be assembled in the first body tube 110.

According to still another exemplary embodiment of the present disclosure, the baffle connection unit 143 may be implemented to be extendable. Specifically, when the baffle connection unit 143 is assembled in the light transmission assembly groove 114 of the first body tube 110, the baffle connection unit 143 is implemented to be extendable to adjust an interval between the first light transmission assembly unit 142 and the second light transmission assembly unit 144. Accordingly, the baffle connection unit 143 may be applied to a plurality of first body tubes 110 according to one light transmission baffle 141. By doing this, when the light transmission baffle 141 is applied to the first body tube 110, the light transmission baffle 141 is implemented to be extendable according to a size of the light transmission assembly groove 114 and when the light transmission baffle 141 is assembled in the first body tube 110 according to a size of the hole of the light transmission baffle 141, the light transmission baffle is extended without being separately manufactured. At this time, the baffle connection unit 143 may be slidably extended, but is not necessarily limited thereto.

Referring to FIG. 7A, the first light transmission assembly unit 142 and the second light transmission assembly unit 144 may be implemented such that upper ends partially protrude. At this time, when the partially protruding shapes of the upper ends of the first light transmission assembly unit 142 and the second light transmission assembly unit 144 are assembled in the first body tube 110, the partially protruding shapes are assembled and fixed in the groove formed in a position which is assembled in the first body tube 110.

According to the exemplary embodiment of the present disclosure, the first light transmission groove of the first light transmission assembly unit 142 may be implemented to be larger than the second light transmission groove of the second light transmission assembly unit 144, but is not necessarily limited thereto.

The first light transmission groove and the second light transmission groove may be implemented to have the same shape as the external shape of the light transmission lens 112.

According to the exemplary embodiment of the present disclosure, the first light transmission groove and the second light transmission groove may control the directionality and straightness of transmission light passing therethrough. For example, the first light transmission groove and the second light transmission groove may be implemented to limit the movement of the transmission light and may be formed with an oval shape, but are not necessarily limited thereto.

The first light transmission groove and the second light transmission groove may be implemented to have a C-cut shape whose diameter is increased to a direction in which the transmission light enters to be emitted, but are not necessarily limited thereto.

Referring to FIG. 7B, the light reception baffle 145 includes a light reception assembly unit 146 and a bandpass filter 148. Specifically, the light reception baffle 144 may be assembled in the second body tube 120 such that the light reception assembly unit 146 and the bandpass filter 148 are spaced apart from each other.

The light reception assembly unit 146 may be implemented such that an upper end partially protrudes. When the partially protruding upper end of the light reception assembly unit 146 is assembled in the second body tube 120, the partially protruding shape is assembled in a groove formed in a position assembled in the second body tube 120 to be fixed.

A light reception groove of the light reception assembly unit 146 may be implemented to have the same shape as an outside of the light reception lens 122.

According to the exemplary embodiment of the present disclosure, the light reception groove may control the directionality and the straightness of the transmission light passing therethrough. For example, the light reception groove may be implemented to limit the movement of the reception light and may be formed with an oval shape, but are not necessarily limited thereto.

The light reception groove may be implemented to have a C-cut shape whose diameter is increased to a direction in which the reception light enters to be emitted, but is not necessarily limited thereto.

According to the exemplary embodiment of the present disclosure, the light transmission baffle 141 and the light reception baffle 145 are slidably assembled in the second body tube 110 and the first body tube 120 of FIG. 6 to be fixed, but are not necessarily limited thereto.

According to the exemplary embodiment of the present disclosure, in order to prevent the light transmission in an undesired direction, the baffle 140 puts a C-cut in the light transmission groove (aperture) or the light reception groove (aperture) to allow the light to be directed only to the center. At this time, the shape applied to the light transmission groove (aperture) or the light reception groove (aperture) is not limited to the C-cut.

Figure 8:
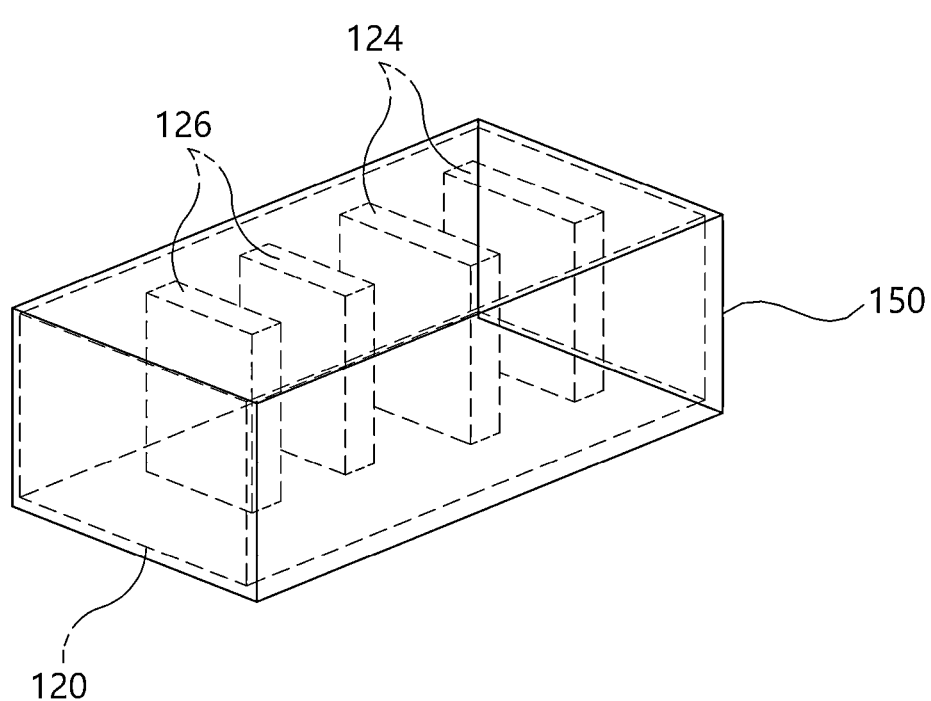
FIG. 8 is a view illustrating a shielding unit of a transmission/reception module according to an exemplary embodiment of the present disclosure.

FIG. 8 is a view illustrating a shielding unit of a transmission/reception module according to an exemplary embodiment of the present disclosure.

Referring to FIG. 8, the transmission/reception module 100 further includes a shielding unit 150.

The shielding unit 150 may be implemented to enclose at least one side surface of the first body tube 110 or the second body tube 120 which forms a plurality of grooves to assemble the baffle 140 according to a field of view of the transmission light and the reception light. For example, the shielding unit 150 is implemented to integrally enclose the first body tube 110 or the second body tube 120 or to separately enclose the first body tube and the second body tube, but is not necessarily limited thereto.

The shielding unit 150 encloses the first body tube 110 or the second body tube 120 to be spaced apart from at least one side surface thereof with a predetermined distance and limits the transmitted or received light from moving to the outside along a groove in which the baffle 140 is not assembled, among the plurality of grooves.

According to an exemplary embodiment of the present disclosure, the shielding unit 150 may be assembled to block the groove to prevent the light from being leaked to the outside by a remaining groove after the baffle 140 is assembled, among the plurality of grooves for assembling the baffle 140. At this time, the shielding unit 150 may be assembled to be implemented with the same shape as a groove to block only the groove remaining after the baffle 140 is assembled or implemented to block all at least one side surface of the first body tube 110 or the second body tube 120. At this time, the shielding unit 150 may be slidably assembled, but is not necessarily limited thereto, but may be assembled as a block to connect the side surfaces to each other.

Figure 9:
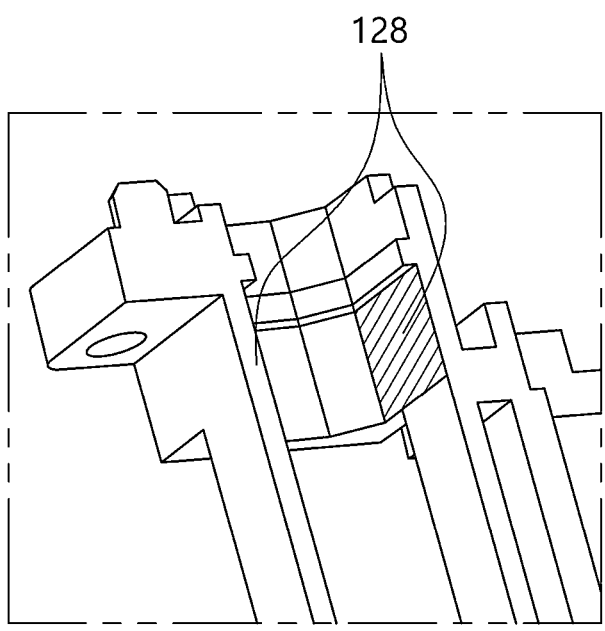
FIG. 9 is a view illustrating an absorber which is applied to a transmission/reception module according to an exemplary embodiment of the present disclosure.

FIG. 9 is a view illustrating an absorber which is applied to a transmission/reception module according to an exemplary embodiment of the present disclosure.

Referring to FIG. 9, an absorber 128 may be formed on the inside of the second body tube 120. Specifically, the absorber 128 may be applied to one opposite portion of the inside, but is not necessarily limited thereto.

According to the exemplary embodiment of the present disclosure, the absorber 128 is applied to a groove behind the lens of the second body tube 120, but is not necessarily limited thereto.

In the second body tube 120, the absorber 128 which is a light absorbing material is located in a light path of the noise to reduce the noise.

According to still another exemplary embodiment of the present disclosure, the absorber 128 may be further applied to the first body tube 110.

Figure 10:
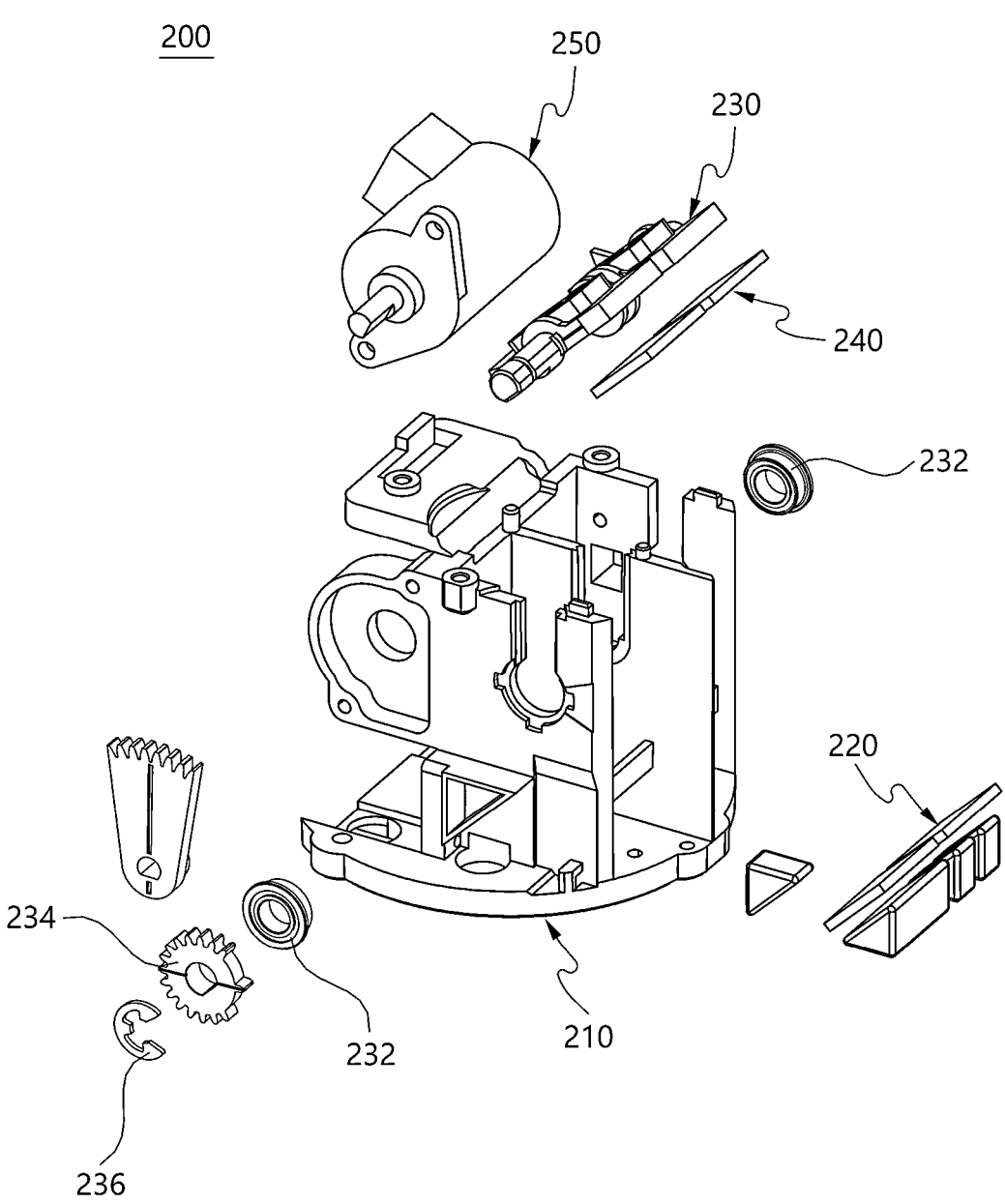
FIG. 10 is a view illustrating a reflector assembly according to an exemplary embodiment of the present disclosure.

FIG. 10 is a view illustrating a reflector assembly according to an exemplary embodiment of the present disclosure.

Referring to FIG. 10, the reflector assembly 200 includes a mirror housing 210, a first reflection unit 220, a mirror holder unit 230, and a second reflection unit 240.

In the reflector assembly 200, the second reflection unit 240 is bonded and assembled in the mirror holder unit 230.

The mirror holder unit 230 may be fixed to the mirror housing 210 by being assembled in the assembly groove formed at an upper end of the mirror housing 210, assembling the bearing 232 at both ends, and then assembling the second gear 234, and assembling the fixing ring 236. At this time, a magnet 238 may be assembled at one end of the mirror holder unit 230, but is not necessarily limited thereto.

In the reflector assembly 200, the first reflection unit 220 is bonded and assembled in the mirror housing 210. At this time, the first reflection unit 220 may be provided in a position corresponding to the transmission/reception module 100, receives transmission light transmitted from the transmission/reception module 100 and transmits the reception light reflected by the object to the transmission/reception module 100.

The reflector assembly 200 further includes a mirror driving unit 250. The mirror driving unit 250 may be assembled in the second gear 234 after assembling the mirror housing 210. Specifically, the mirror driving unit 250 may be assembled such that the first gear 252 and the second gear 234 of the mirror driving unit 250 abut with each other and provide a rotary driving force to the second gear 234 by means of the first gear 252.

Figure 11A:
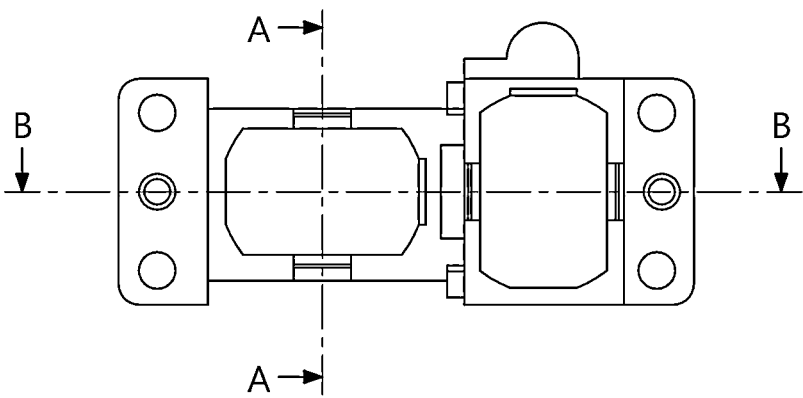
FIGS. 11A to 11C are a reference view illustrating a light reception range layout according to a size of a second body tube PD in a transmission/reception module according to an exemplary embodiment of the present disclosure.
Figure 11B:
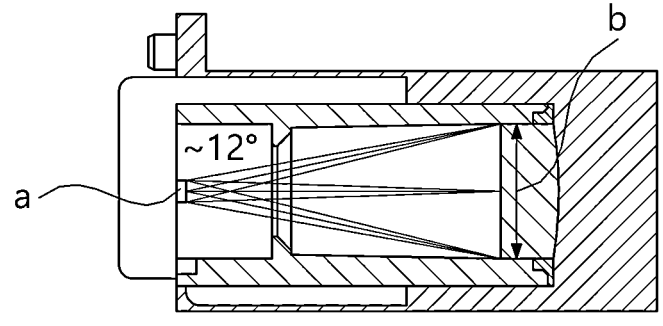
Figure 11C:
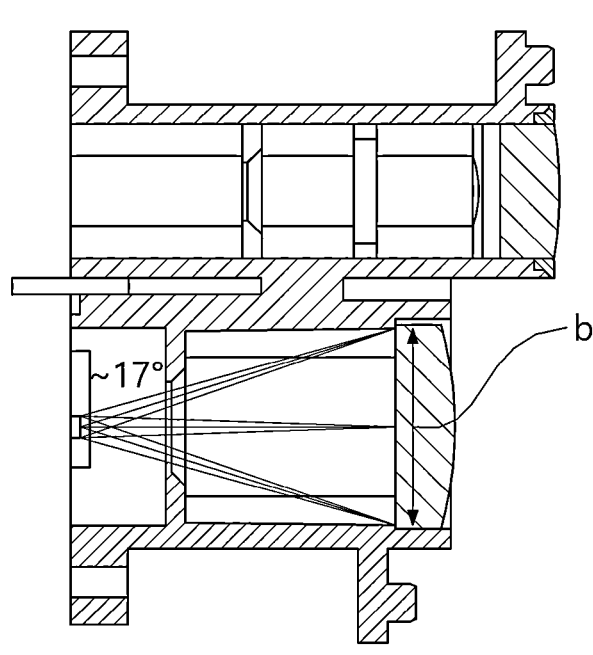

FIG. 11 is a reference view illustrating a light reception range layout according to a size of a second body tube PD in a transmission/reception module of the present disclosure.

A first body tube and a second body tube of the transmission/reception module illustrated in FIG. 11 may be formed with a structure for removing light which is scattered in an undesired direction when the light is transmitted/received. At this time, the first body tube and the second body tube may be implemented as illustrated in FIG. 6, but are not necessarily limited thereto.

Even though in the LIDAR sensor, an angle of transmitting light and an angle of receiving light need to match, in the actual transmission/reception module, there may be a noise signal due to light which moves at different angles. At this time, the first body tube and the second body tube of the LIDAR sensor need to have a structure to transmit or receive light in a desired direction to measure an accurate TOF and light intensity.

It is important to let the light which is not vertically transmitted or received go out of the first body tube and the second body tube so as not to contaminate the light reception signal finally. As illustrated in FIG. 11, in order to prevent the light transmission in the undesired direction, a C-cut is put in the aperture of the baffle which is applied to the first body tube and the second body tube to allow the light to be directed only to the center.

In order to prevent the light reception in the undesired direction, the LIDAR sensor optimizes a position of the baffle of the first body tube and the second body tube, minimizes the size of the baffle hole, and minimizes the noise by modifying a shape of the baffle.

Specifically, the first body tube may include a first light transmission assembly unit including a first light transmission groove of the aperture to which the light transmission baffle and a second light transmission assembly unit including a second light transmission groove. In the first body tube, the first light transmission groove and the second light transmission groove of the first light transmission assembly unit and the second light transmission assembly unit which provide light paths may be implemented in a circle, an oval, or a track type.

According to the exemplary embodiment, it is desirable to implement such that a size of the first light transmission groove is larger than a size of the second light transmission groove. At this time, the first light transmission assembly unit which forms the first light transmission groove is located to be close to the light transmission lens.

Figure 12A:
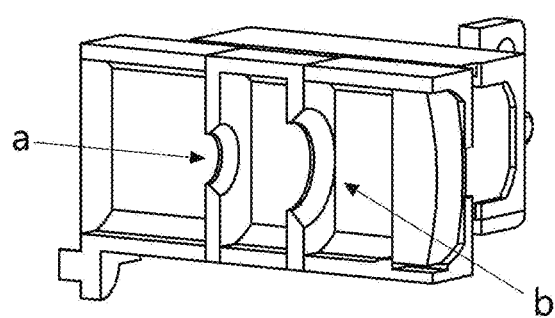
FIGS. 12A to 16B are views illustrating a structure of a second body tube according to another embodiment of the present disclosure and a light distribution thereby.

Referring to FIGS. 11B and 12C, the second body tube of the transmission/reception module is implemented to be spaced apart from a light source a and a cross-section taken along the A-A is implemented as a longitudinal axis b of a minor axis and a cross-section along the B-B is implemented as a transverse axis c of a major axis, but are not necessarily limited thereto.

According to the exemplary embodiment, the light source a is implemented to be 0.5 mm to 1.5 mm×0.5 mm to 1.5 mm, the longitudinal axis b is implemented to be 6 mm to 8 mm, and the transverse axis c is implemented to be 9 mm to 11 mm. Desirably, the light source a is implemented to be 1 mm×1 mm, the longitudinal axis b is implemented to be 7 mm, and the transverse axis c is implemented to be 10.2 mm.

From a result obtained by analyzing a result of a simulation of the first body of the related art, a quantity of stray light may be a relative value by the simulation result of 100% reflection of the first body tube and angle distribution of the light source used for the simulation. Further, it is confirmed that a noise signal caused by the first body tube and the device is generated in the vicinity of 20° to 27°. Here, the actual reflectance may be a less light quantity, but may show a tendency similar to 24° which is a problem.

Accordingly, referring to FIG. 11, the size of the aperture is minimized in accordance with the light reception layout in a simulation accessing direction to reduce the noise of the second body tube and optimize the position of the aperture, changes the structure of the baffle to reduce the noise of the second body tube.

Therefore, various shapes of the second body tube for reducing the noise of the second body tube will be described in detail with reference to FIGS. 12 to 16.

FIGS. 12 to 16 are views illustrating a structure of a second body tube according to another embodiment of the present disclosure and a light distribution thereby.

Figure 12B:
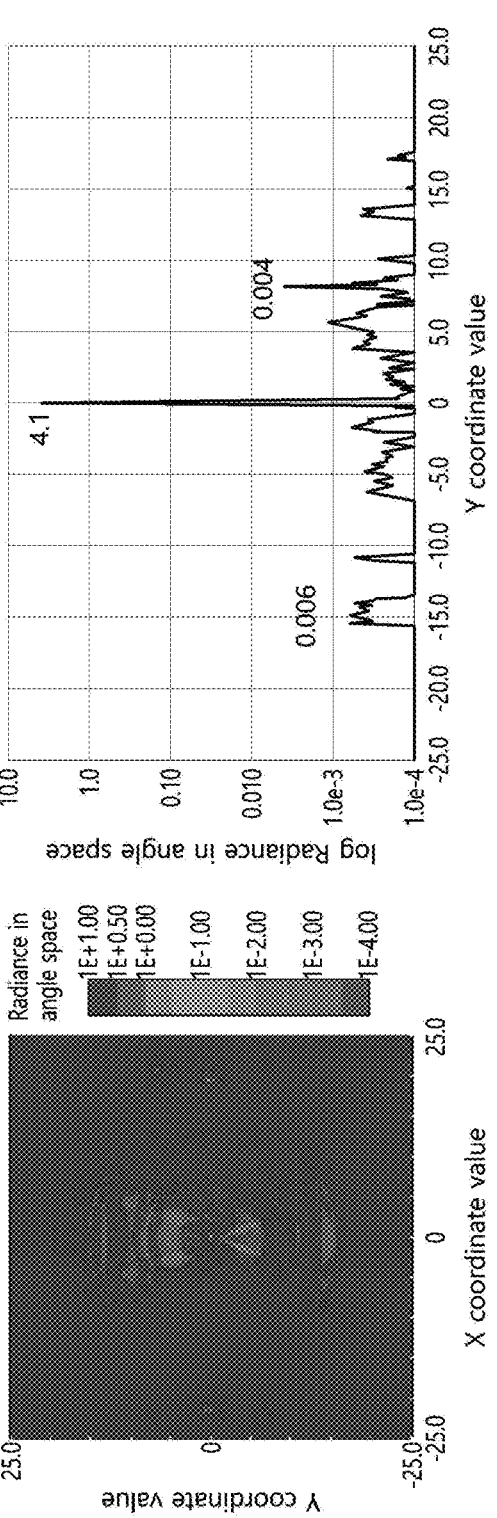

FIG. 12 is a view illustrating the distribution of the transmission light according to the embodiment of the present disclosure when a shape of the baffle applied to the first body tube of the related art is modified.

Referring to FIG. 12, the distribution of the transmission light is set to 100% reflection in all surfaces. At this time, a quantity of stray light is exaggerated to be checked.

Stray Light refers to undesirable light caused by causes other than regular refraction or reflection.

According to the result obtained by analyzing the result of the simulation of the first body tube of the related art, when the main signal is 0°, the light quantity is small, but there may be light in the vicinity of ±15°. Further, it is determined that there may be a difference in the angles of the noise generated at 24° which is a problem and light in the vicinity of ±15° in consideration of the measurement error. Further, when the LIDAR sensor has a good efficiency, even small light quantity may be reflected from a nearby place.

Referring to FIG. 12, the first body tube may be implemented to include two apertures. Specifically, the first body tube may include a first aperture a and a second aperture b.

At this time, in order to reduce the noise of the first body tube, when a C-cut is added to the second aperture b, it is confirmed that a reflection area is reduced to reduce light in the vicinity of ±15°.

Further, from the simulation result of a reflectance of 50% of the first body tube, it is confirmed that the noise due to the multi-reflection by the baffle is reduced.

Figure 13A:
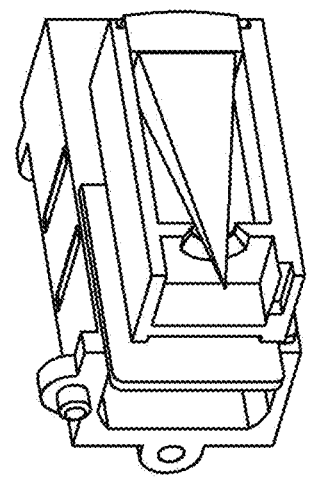
Figure 13A:
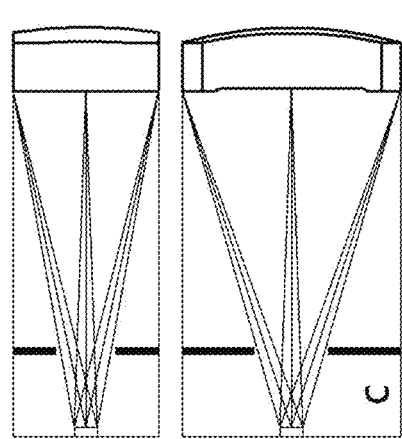
Figure 13A:
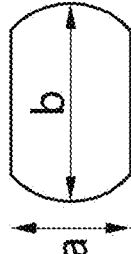
Figure 13B:
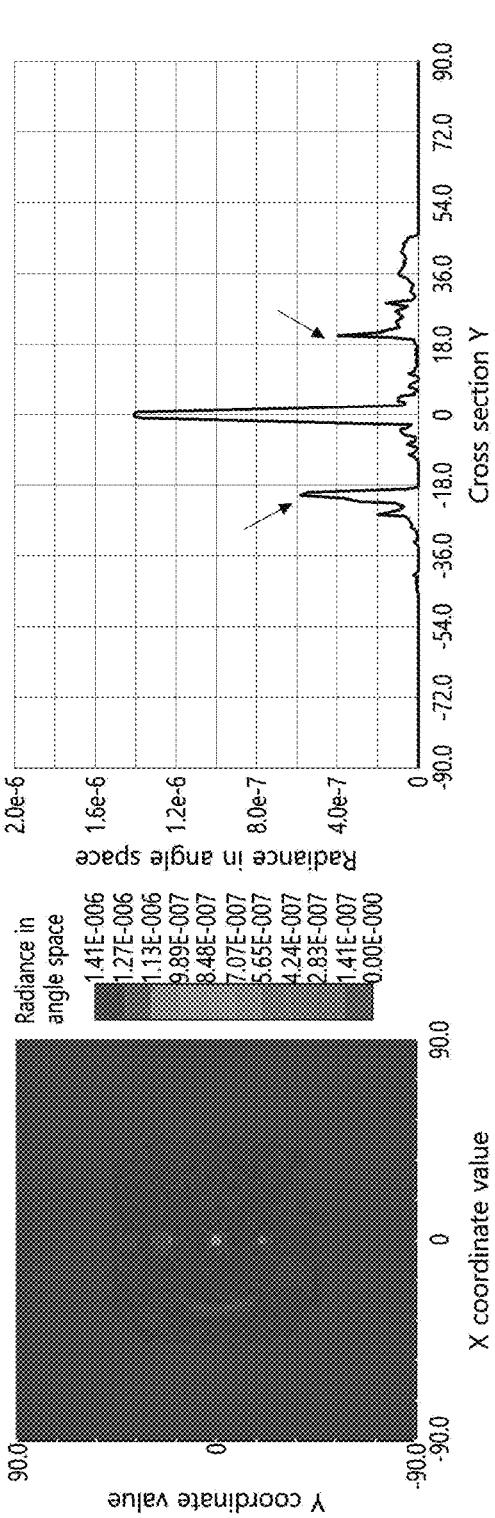

FIG. 13A illustrates a structure of a second body tube according to a first exemplary embodiment of the present disclosure and FIG. 13B is a view illustrating distribution of light according to FIG. 13A.

Referring to FIG. 13, a position of the light reception baffle of the second body tube is changed to be implemented in a position c close to the light source. For example, a light reception groove of the light reception baffle is implemented such that a longitudinal axis a is 2.6 mm and a diameter of a transverse axis b is Φ3.2. At this time, the light reception baffle is implemented to be located in a position c depart from the light source by 3 mm to 5 mm, and desirably, 4 mm.

Referring to FIG. 13B, it is confirmed that the light distribution according to the light reception baffle of the second body tube is strongest when the main signal is 0° and the stray light is generated therearound. Approximately, the stray light is present around 0° to ±50°.

Figure 14A:
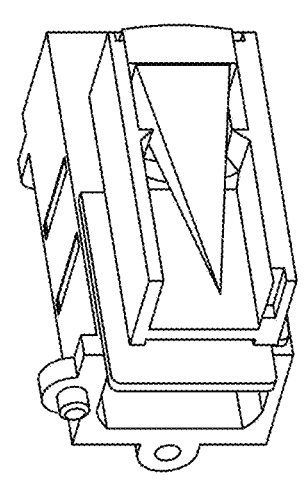
Figure 14A:
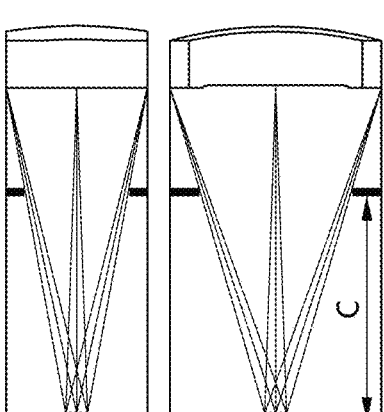
Figure 14A:
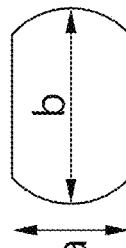
Figure 14B:
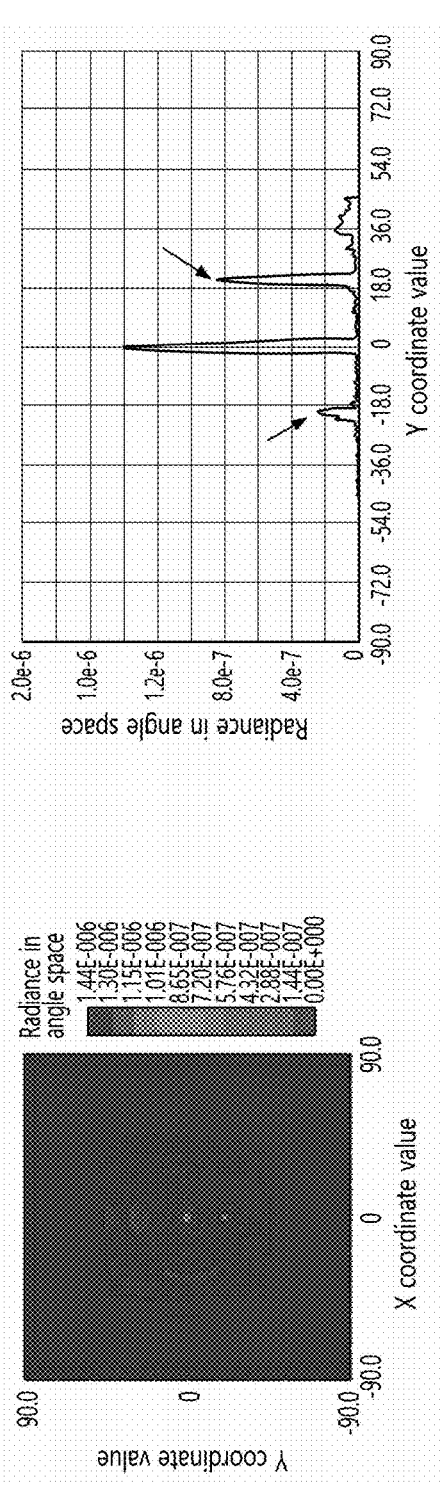

FIG. 14A illustrates a structure of a second body tube according to a second exemplary embodiment of the present disclosure and FIG. 14B is a view illustrating distribution of light according to FIG. 14A.

Referring to FIG. 14, a position of the light reception baffle of the second body tube is changed to be implemented in a position c close to the light source. For example, a light reception groove of the light reception baffle is implemented such that a longitudinal axis a is 3.2 mm and a diameter of a transverse axis b is Φ4.2. At this time, the light reception baffle is implemented to be located in a position c depart from the light source by 5 mm to 7 mm, and desirably, 6 mm.

Referring to FIG. 14B, it is confirmed that the light distribution according to the light reception baffle of the second body tube is strongest when the main signal is 0° and the stray light is generated therearound. Approximately, the stray light is present around 0° to ±50°.

Figure 15A:
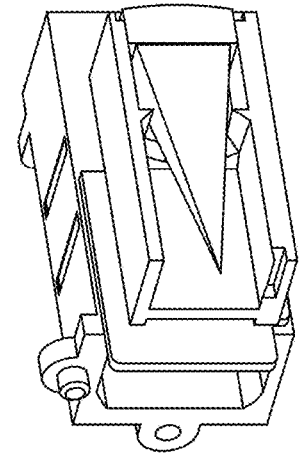
Figure 15A:
Figure 15A:
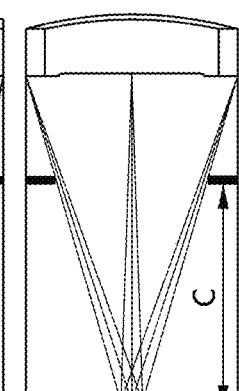
Figure 15A:
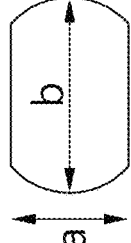
Figure 15B:
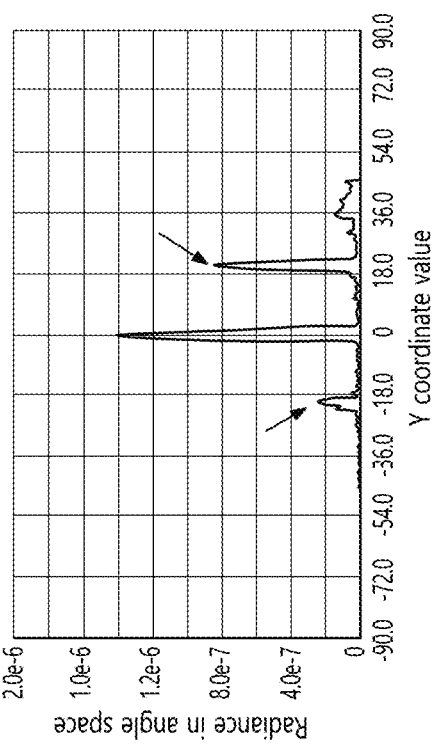
Figure 15B:
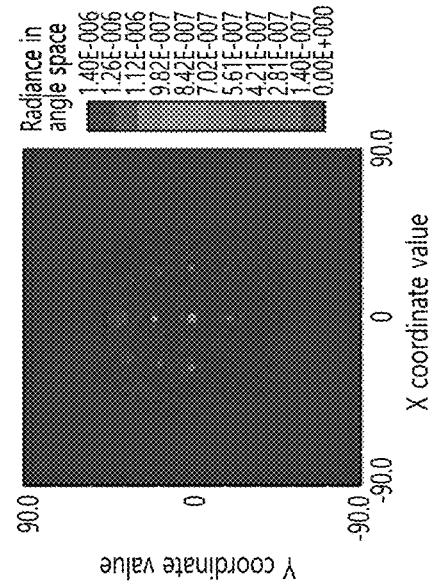

FIG. 15A illustrates a structure of a second body tube according to a third exemplary embodiment of the present disclosure and FIG. 15B is a view illustrating distribution of light according to FIG. 15A.

Referring to FIG. 15, a position of the light reception baffle of the second body tube is changed to be implemented in a position c spaced apart from the light source with a predetermined distance. For example, a light reception groove of the light reception baffle is implemented such that a longitudinal axis a is 4 mm and a diameter of a transverse axis b is Φ5.4. At this time, the light reception baffle is implemented to be located in a position c depart from the light source by 7 mm to 9 mm, and desirably, 8 mm.

Referring to FIG. 15B, it is confirmed that the light distribution according to the light reception baffle of the second body tube is strongest when the main signal is 0° and the stray light is generated therearound. Approximately, the stray light is present around 0° to ±50°.

Figure 16A:
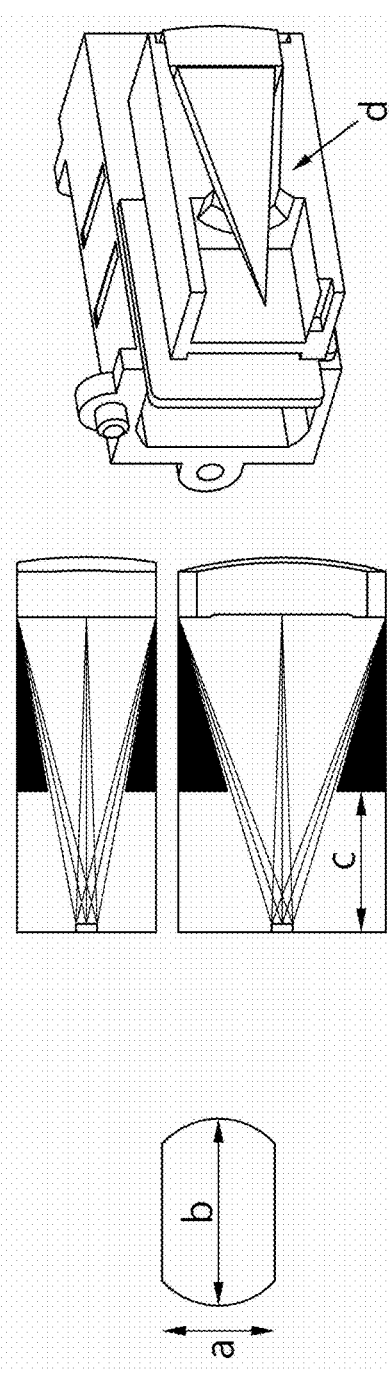
Figure 16B:
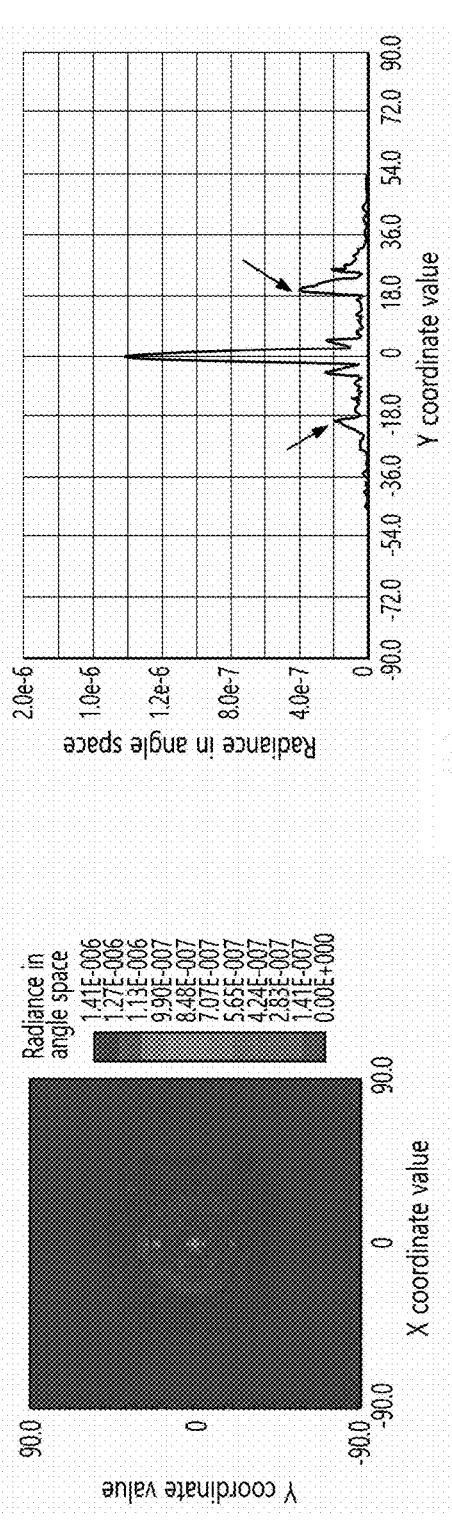

FIG. 16A illustrates a structure of a second body tube according to a fourth exemplary embodiment of the present disclosure and FIG. 16B is a view illustrating distribution of light according to FIG. 16A.

Referring to FIG. 16, a position of the light reception baffle of the second body tube is changed to be implemented in a position c spaced apart from the light source with a predetermined distance and in a position close to the light reception lens. For example, a light reception groove of the light reception baffle is implemented such that a longitudinal axis a is 5.3 mm and a diameter of a transverse axis b is Φ7.6. At this time, the light reception baffle is implemented to be located in a position c depart from the light source by 11 mm to 13 mm, and desirably, 12 mm.

Referring to FIG. 16B, it is confirmed that the light distribution according to the light reception baffle of the second body tube is strongest when the main signal is 0° and the stray light is generated therearound. Approximately, the stray light is present around 0° to ±50°.

Accordingly, from FIGS. 13 to 16, as the light reception baffle of the second body tube is implemented in a position farther than the light source to check a main signal and stray light when the longitudinal axis a and the transverse axis b are implemented to be larger.

Referring to FIGS. 13 to 16, when a result of optimizing a position of the light reception groove of the light reception baffle of the second body tube is checked, it is confirmed that the noise angle is changed according to the position of the light reception groove. It is further confirmed that the noise is reduced around 8 mm from the end of the second body tube.

Further, when the light path where the noise is generated is analyzed, the absorber is applied to a part of the second body tube to find out a position of the absorber from which the noise is cancelled and track a path reflected in the position of the absorber.

The light transmission/reception module of the present disclosure is an instrument which removes light which is not directed to the element during the light transmission/reception, but is scattered. The present device measures a time of flight which is a reciprocating motion time to accurately measure the distance. In order to measure an accurate ToF, an exact light emission time/light reception time is necessary. In order to know the exact light transmission/reception time, an ideal path of the most direct light is a light emitting diode→a target object→a light reception element. However, actually, there is light which is scattered to enter late, which serves as a noise of an actual signal to cause distortion in the final distance measurement. To this end, light is desired to be transmitted/received only to the center of the light emission/reception element and other side light needs to be removed. According to the exemplary embodiment, the noise of light which is incident onto the second body tube module is effectively reduced to increase the accuracy of the sensor.

Figure 17:
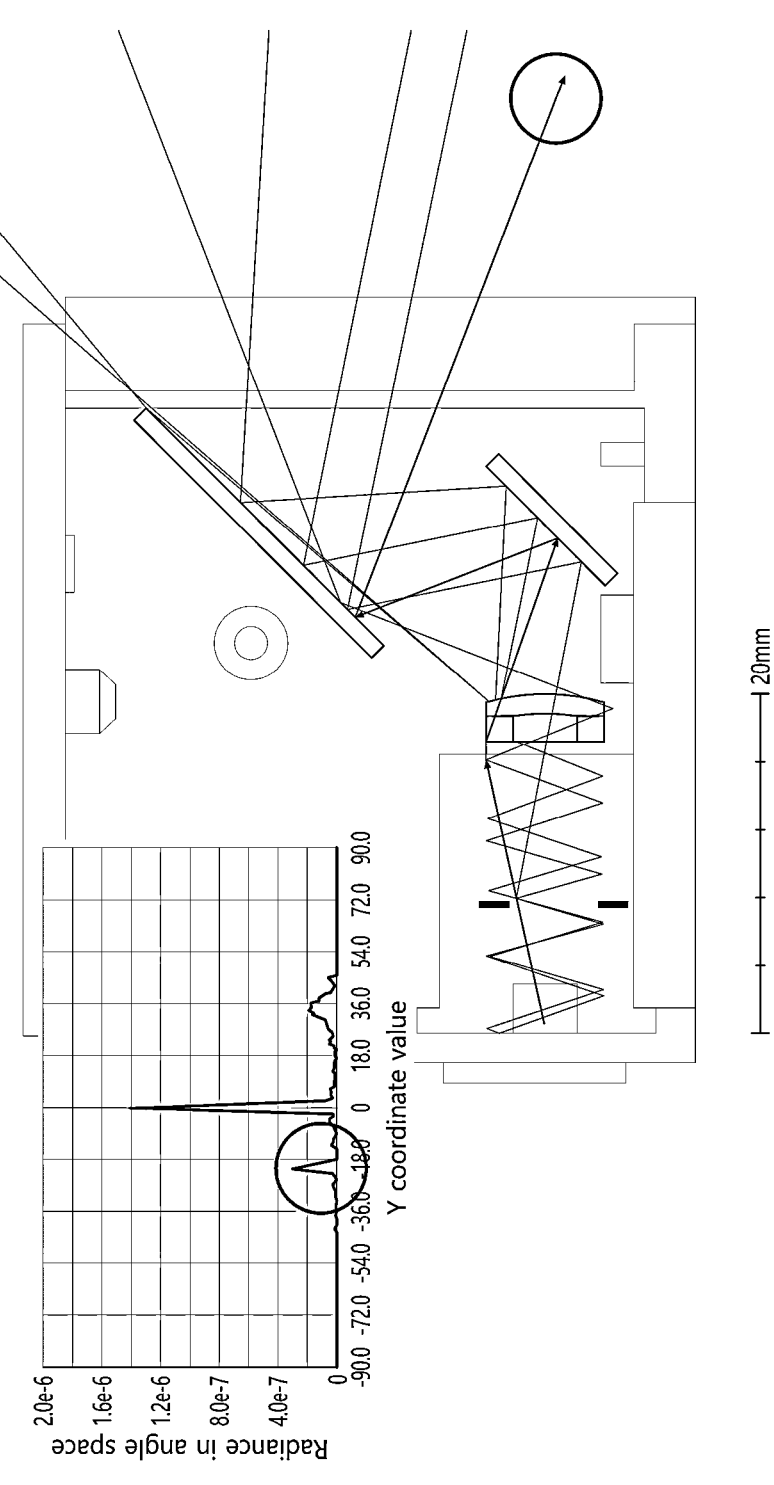
Figure 18:
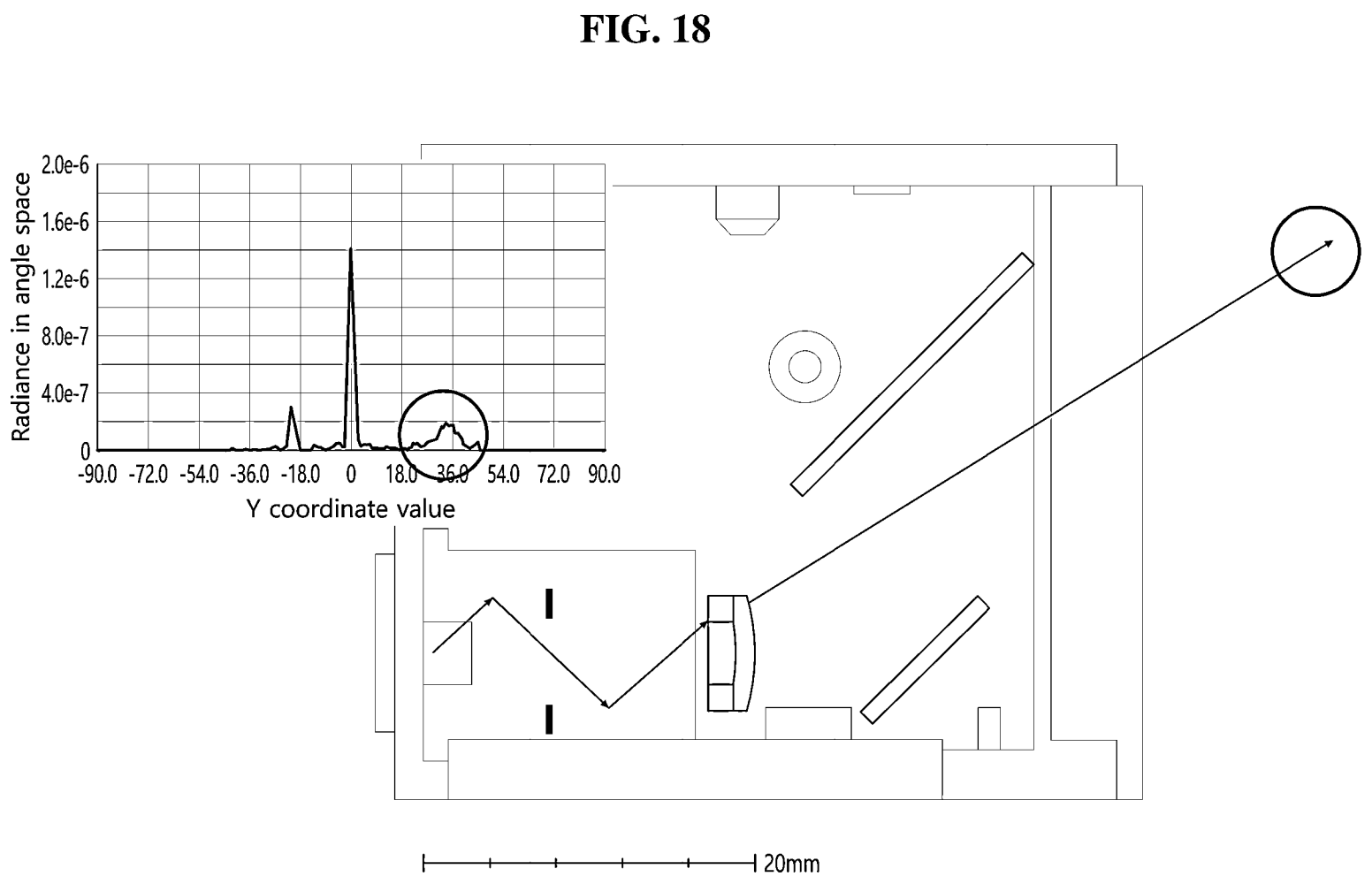

FIGS. 17 and 18 are experimental results illustrating a reflection light path according to a structure of a light transmitter/receiver module according to an exemplary embodiment.

FIG. 17 is a view illustrating a reflection light path in the vicinity of −18° of a second body tube according to the exemplary embodiment of the present disclosure and FIG. 18 is a view illustrating a reflection light path in the vicinity of 36° of a second body tube according to the exemplary embodiment of the present disclosure. At this time, a structure of the second body tube of FIG. 15 may be applied to the second body tube.

Referring to FIGS. 17 and 18, as the result of analyzing a light path from which noise is generated, it is confirmed that in the second body tube of FIG. 15, reflection light in the vicinity of an upper light reception lens of the second body tube generates −23° noise and reflection light in the lower end portion of the body tube generates +30° noise.

In order to reduce the noise, an absorbing material may be disposed in the position of the second body tube of the noise light path. Further, the shape of the baffle or the shape of the instrument surface may be changed by spreading the noise to reduce a light quantity.

Therefore, various shapes of the baffle of the second body tube for reducing the noise of the second body tube will be described in detail with reference to FIGS. 19 to 22.

FIGS. 19 to 22 are views illustrating a structure of a second body tube according to another embodiment of the present disclosure and a light distribution thereby.

Figure 19A:
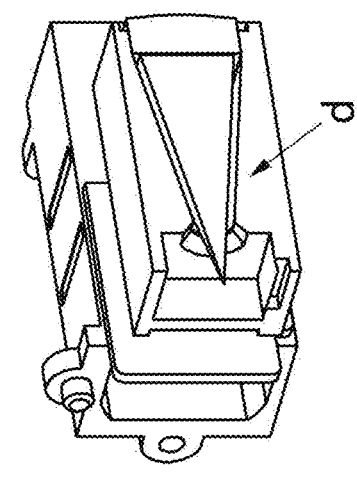
FIGS. 19A to 22B are views illustrating a structure of a second body tube according to another embodiment of the present disclosure and a light distribution thereby.
Figure 19A:
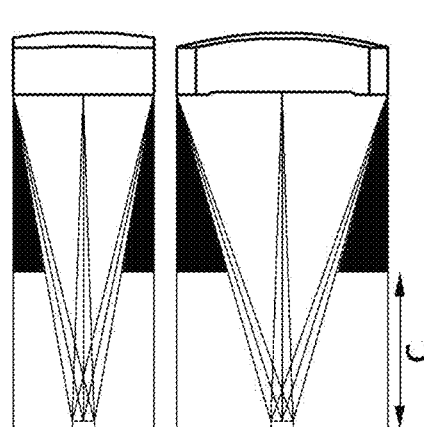
Figure 19A:
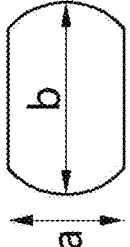
Figure 19B:
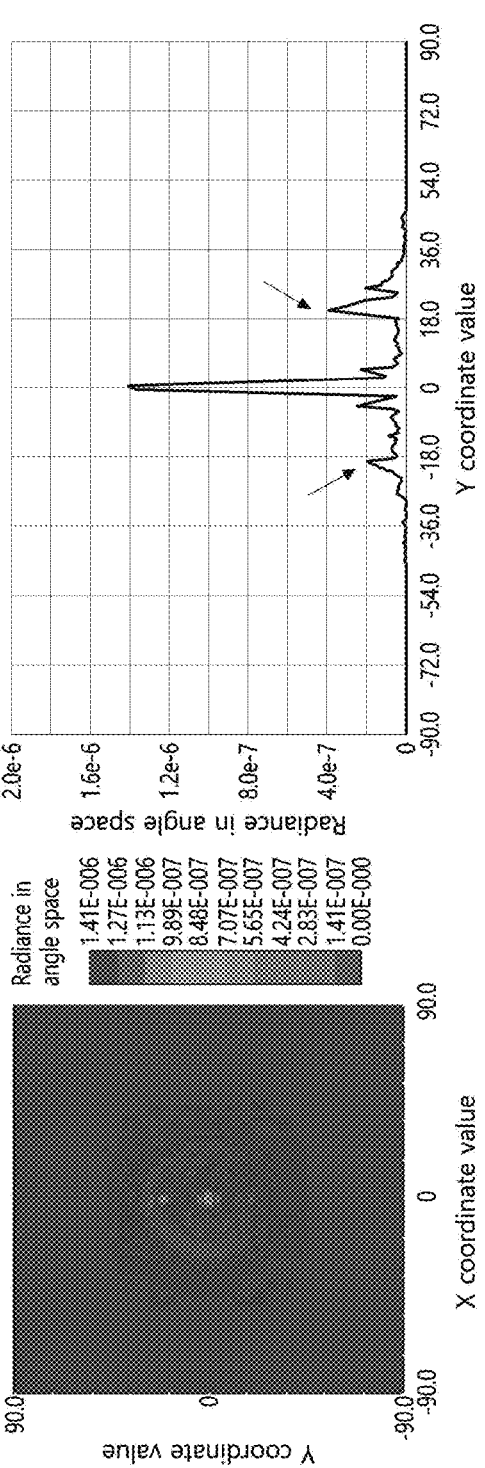

FIG. 19A illustrates a structure of a baffle of a second body tube according to a first exemplary embodiment of the present disclosure and FIG. 19B is a view illustrating distribution of light according to FIG. 19A.

Referring to FIG. 19, a shape of the light reception baffle of the second body tube is changed to be implemented in a position c spaced apart from the light source with a predetermined distance. Here, a structure and a position of the second body tube of FIG. 15 is applied to the second body tube and for example, a longitudinal axis a of a light reception groove of the light reception baffle is implemented to be 4 mm and a diameter of a transverse axis b is implemented to be Φ5.4. At this time, the light reception baffle is implemented to be located in a position c depart from the light source by 7 mm to 9 mm, and desirably, 8 mm. Further, the light reception baffle of the second body tube may be implemented with an inclined surface d added thereto.

Referring to FIG. 19B, it is confirmed that the light distribution according to the light reception baffle of the second body tube is strongest when the main signal is 0° and the stray light is generated therearound. Approximately, the stray light is present around 0° to ±36°.

Figure 20A:
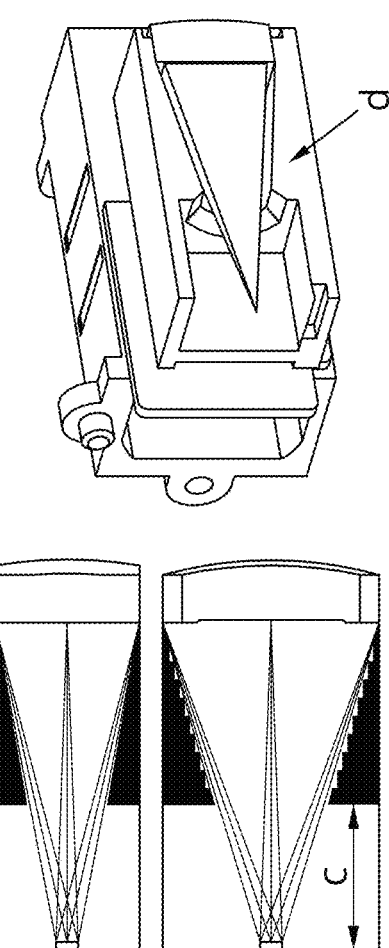
Figure 20A:
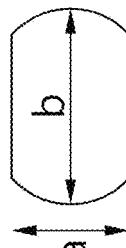
Figure 20B:
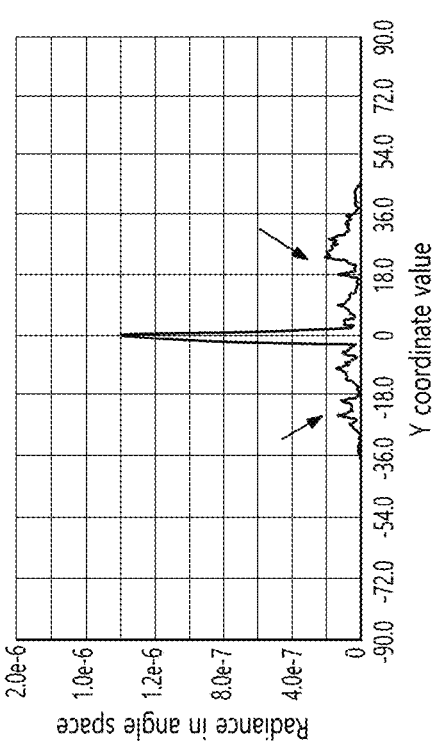
Figure 20B:
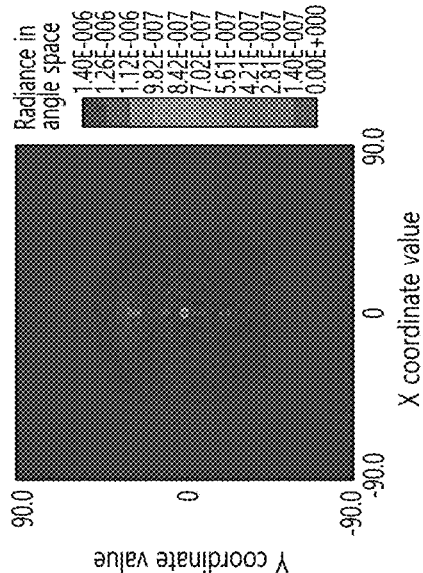

FIG. 20A illustrates a structure of a baffle of a second body tube according to a second exemplary embodiment of the present disclosure and FIG. 20B is a view illustrating distribution of light according to FIG. 20A.

Referring to FIG. 20, a shape of the light reception baffle of the second body tube is changed to be implemented in a position c spaced apart from the light source with a predetermined distance. Here, a structure and a position of the second body tube of FIG. 15 is applied to the second body tube and for example, a longitudinal axis a of a light reception groove of the light reception baffle is implemented to be 4 mm and a diameter of a transverse axis b is implemented to be Φ5.4. At this time, the light reception baffle is implemented to be located in a position c depart from the light source by 7 mm to 9 mm, and desirably, 8 mm. Further, the light reception baffle of the second body tube may be implemented with a step added to the inclined surface d. Specifically, the step on the inclined surface d may be implemented as a step as the diameter is increased toward the light reception lens.

Referring to FIG. 20B, it is confirmed that the light distribution according to the light reception baffle of the second body tube is strongest when the main signal is 0° and the stray light is generated therearound. Approximately, the stray light is present around 0° to ±50°.

Figure 21A:
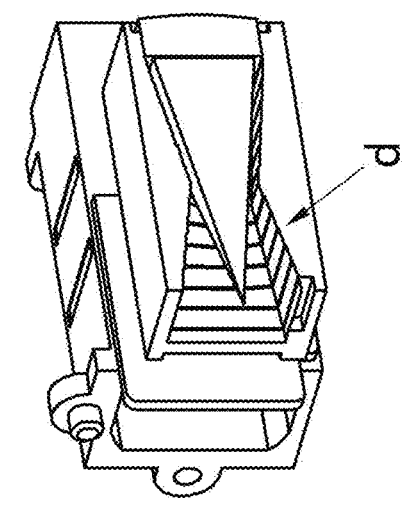
Figure 21A:
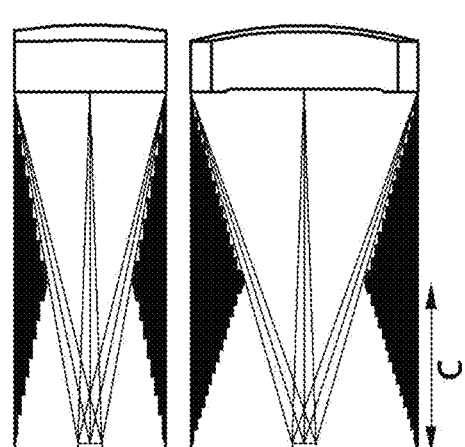
Figure 21A:
Figure 21A:
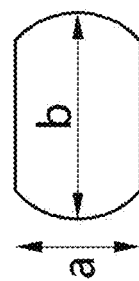
Figure 21B:
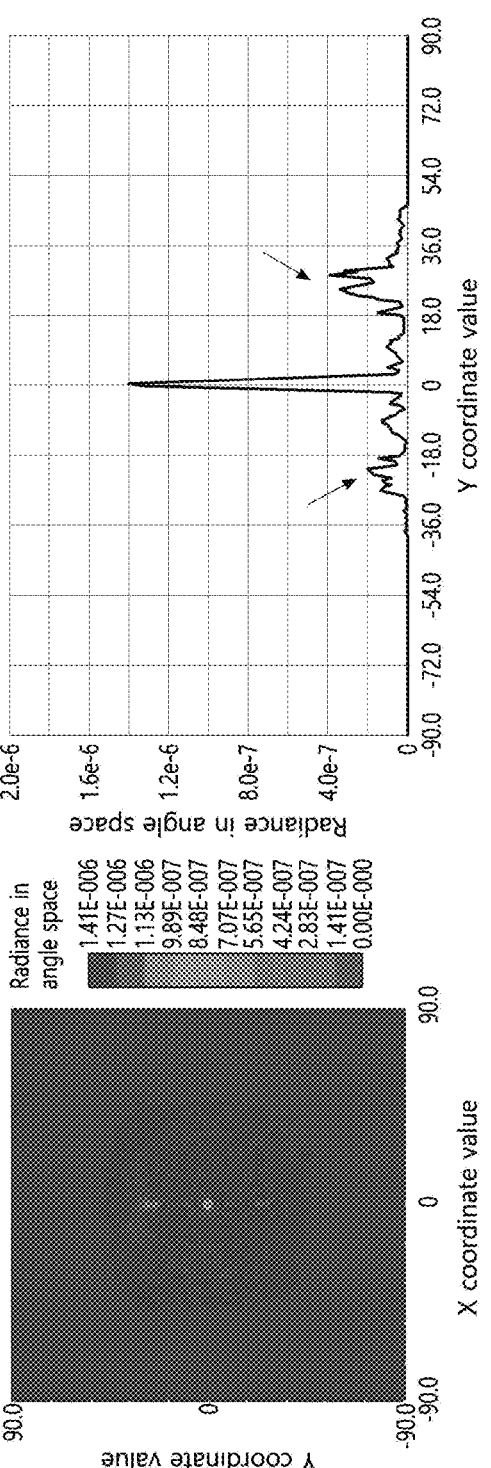

FIG. 21A illustrates a structure of a baffle of a second body tube according to a third exemplary embodiment of the present disclosure and FIG. 21B is a view illustrating distribution of light according to FIG. 21A.

Referring to FIG. 21, a shape of the light reception baffle of the second body tube is changed to be implemented in a position c spaced apart from the light source with a predetermined distance. Here, a structure and a position of the second body tube of FIG. 15 is applied to the second body tube and for example, a longitudinal axis a of a light reception groove of the light reception baffle is implemented to be 4 mm and a diameter of a transverse axis b is implemented to be Φ5.4. At this time, the light reception baffle is implemented to be located in a position c depart from the light source by 7 mm to 9 mm, and desirably, 8 mm. Further, the light reception baffle of the second body tube may be implemented to have a shape in which a step is added to the inclined surface d where the light source is located in the baffle shape of the second body tube of FIG. 19. Specifically, when the step is added to the inclined surface d where the light is located, the diameter is increased toward the light source to show the step shape.

Referring to FIG. 21B, it is confirmed that the light distribution according to the light reception baffle of the second body tube is strongest when the main signal is 0° and the stray light is generated therearound. Approximately, the stray light is present around 0° to ±50°.

Figure 22A:
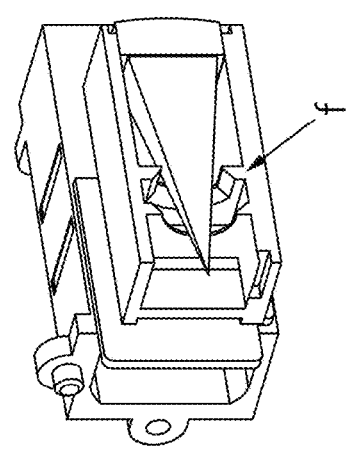
Figure 22A:
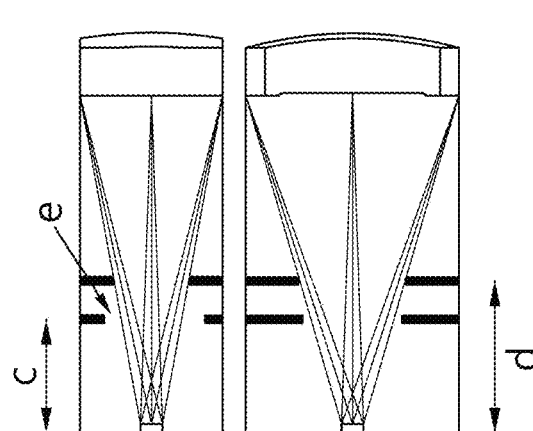
Figure 22A:
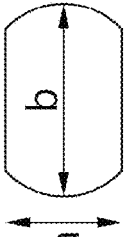
Figure 22B:
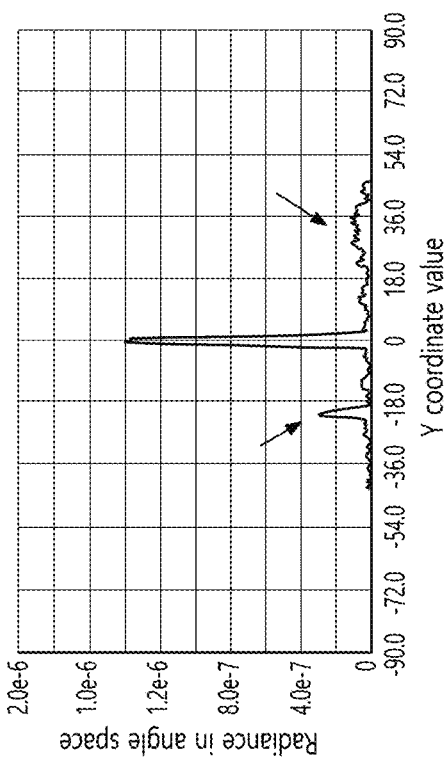
Figure 22B:
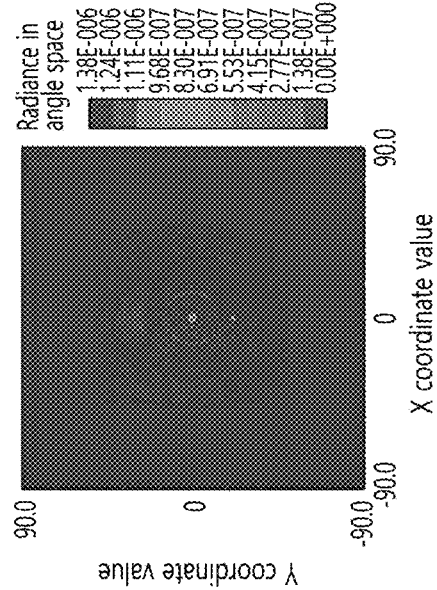

FIG. 22A illustrates a structure of a baffle of a second body tube according to a fourth exemplary embodiment of the present disclosure and FIG. 22B is a view illustrating distribution of light according to FIG. 22A.

Referring to FIG. 22, a shape of the light reception baffle of the second body tube is changed to be implemented in a position c spaced apart from the light source with a predetermined distance. Here, a structure and a position of the second body tube of FIG. 15 is applied to the second body tube and for example, a longitudinal axis a of a light reception groove of the light reception baffle is implemented to be 4 mm and a diameter of a transverse axis b is implemented to be Φ5.4. At this time, the light reception baffle is implemented to be located in a position c depart from the light source by 7 mm to 9 mm, and desirably, 8 mm. Further, the light reception baffle of the second body tube may be implemented with a light reception groove added in a 5 mm position. Specifically, in the second body tube, light reception grooves may be added in positions depart from the light source by 5 mm and 8 mm.

Referring to FIG. 22B, it is confirmed that the light distribution according to the light reception baffle of the second body tube is strongest when the main signal is 0° and the stray light is generated therearound. Approximately, the stray light is present around 0° to ±50°.

Accordingly, when the C-cut is added to the light reception baffle in which the light reception baffle is formed in the first body tube, the LIDAR sensor may reduce the nose in the vicinity of ±15°. Further, in the LIDAR sensor, an absorbing material which absorbs light is disposed in the second body tube to reduce the noise and a shape or a surface shape of the light reception baffle applied to the second body tube is changed to reduce the noise.

For example, it is confirmed that the smallest noise is generated in a combination of the light reception groove in the 8 mm-position and a step on the inclined surface close to the light reception lens in the light reception groove. Further, the surface shape is further subdivided to help to remove the noise spreading.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A LIDAR sensor, comprising:
a transmission and reception module which transmits transmission light, and receives reception light reflected from an object, and which removes the transmission light or the reception light moving in a predetermined direction;
a reflector assembly which has an empty space to assemble the transmission and reception module at a side, and which receives the transmission light from the transmission and reception module to reflect the transmission light toward the object, and which transmits the reception light reflected from the object to the transmission and reception module;
a rotary module which s connected to a lower portion of the transmission and reception module, and which generates a torque to be implemented to be rotatable; and
a fixing module which supports the transmission and reception module and the rotary module,
wherein the transmission and reception module includes:
a first body tube which provides a path through which the transmission light moves and is assembled with a transmission lens on a front surface of the first body tube;
a second body tube which is spaced apart from the first body tube, provides a path through which the reception light moves, and is assembled with a reception lens on a front surface of the second body tube;
a circuit board which is assembled on rear surfaces of the first body tube and the second body tube, which includes a light source for transmitting the transmission light and which processes the reception light to acquire distance information to the object; and a baffle which is assembled on a side surface of the first body tube and the second body tube and which cancels a noise due to the transmission light and the reception light, wherein the baffle includes:

a light transmission baffle which is assembled on the first body tube and which has at least one groove through which the transmission light passes; and a light reception baffle which is assembled on the second body tube and which has at least one groove through which the reception light passes, wherein the baffle is slidably assembled in assembly grooves formed on lower side surfaces of the first body tube and the second body tube.

2. The LIDAR sensor according to claim 1, wherein the light transmission baffle includes: a first light transmission assembly unit including a first light transmission groove; and a second light transmission assembly unit including a second light transmission groove which is formed to have smaller area than that of the first light transmission groove and is assembled on the first body tube such that the first light transmission assembly unit is disposed in front of the second light transmission assembly unit.

3. The LIDAR sensor according to claim 2, wherein the first light transmission groove and the second light transmission groove are implemented to form an inclination as a diameter increases toward the transmission lens so as to move the transmission light only in a predetermined direction and are formed to be rounded or inclined by obliquely chamfering an edge or a corner.

4. The LIDAR sensor according to claim 1, wherein the light reception baffle includes a light reception assembly unit including a light reception groove and a band pass filter which is assembled on the second body tube to be disposed to be spaced apart from a rear end of the light reception assembly unit and passes only the reception light having a predetermined frequency component, and the light reception groove is implemented to form an inclination as a diameter increases toward the reception lens so as to move the reception light only in a predetermined direction.

5. The LIDAR sensor according to claim 4, wherein the light reception assembly unit is designed to have a predetermined size according to a light reception range of the reception light and a step-shaped inclination is formed in a direction where the circuit board is provided or the light reception lens is provided with respect to the light reception groove formed to be spaced apart from the circuit board and a distance between the light reception groove and the circuit board is 7 mm to 9 mm.

6. The LIDAR sensor according to claim 1, wherein the light transmission baffle includes a plurality of light transmission assembly units including light transmission grooves and the plurality of light transmission assembly units is assembled to be located on the first body tube in one line, and the light reception baffle includes a plurality of light reception assembly units which forms light reception grooves and the plurality of light reception assembly units is assembled to be located on the second body tube in one line.

7. The LIDAR sensor according to claim 1, wherein the transmission and reception module further includes:

a shielding unit which encloses at least one side surface of the first body tube or the second body tube which forms a plurality of grooves to assemble the baffle according to a viewing angle of the transmission light and the reception light, and the shielding unit encloses the first body tube or the second body tube to be spaced apart from the at least one side surface with a predetermined distance and limits transmitted or received light from moving to the outside along a groove which is not assembled with the baffle, among the plurality of grooves.

8. The LIDAR sensor according to claim 1, wherein the second body tube includes:

an absorber disposed in a groove formed in a length direction between the baffle and the reception lens, and the absorber absorbs light which moves in a direction in which the absorber is formed, among received light.

9. The LIDAR sensor according to claim 1, wherein the reflector assembly includes:

a mirror housing defining the empty space in which the transmission and reception module is assembled on one lower side;

a first reflection unit which is provided at one lower side of the mirror housing so as to correspond to the transmission and reception module;

a mirror holder unit which is assembled in an assembly groove formed on the mirror housing to be fixed to the mirror housing;

a mirror driving unit which provides a rotary driving force to the mirror holder unit to adjust a reflection direction of a second reflection unit; and a second reflection unit which is fixed to a side surface of the mirror holder unit to rotate by the operation of the mirror holder unit and reflects the transmission light toward the object and receives reception light reflected from the object.

10. The LIDAR sensor according to claim 9, wherein the mirror holder unit includes:

bearings which are assembled on both ends of the mirror holder unit in a state in which the mirror holder unit is assembled in the assembly groove of the mirror housing to be assembled in the mirror housing to be fixed;

a second gear which is assembled at the outside of the bearing to be fixed; and a fixing ring which is assembled to abut with the outside of the second gear to fix the second gear, and the second gear and the fixing ring are assembled only at one end of one of the bearings assembled at both ends to be fixed.

11. The LIDAR sensor according to claim 10, wherein the mirror driving unit includes a first gear which is connected to the second gear, limits an angle range at which the mirror holder unit rotates as the mirror driving unit rotates in a first direction or a second gear within a predetermined angle range by the first gear, and supplies a rotary driving force to the mirror holder unit to rotate the second reflection unit fixed to the mirror holder unit, and a rotation axis of the mirror driving unit and a rotation axis of the mirror holder unit are assembled in the mirror housing to correspond to each other.

12. The LIDAR sensor according to claim 9, wherein the first reflection unit receives the transmission light by means of the transmission and reception module to transmit the transmission light to the second reflection unit and receives the reception light by means of the second reception unit to transmit the reception light to the transmission and reception module.

13. A moving object, comprising:

a LIDAR sensor which transmits transmission light, and receives reception light and which removes transmission light or reception light moving in a predetermined direction; and a moving device which is implemented to move the moving object, wherein the LIDAR sensor includes:

a transmission and reception module which transmits the transmission light, and receives the reception light reflected from an object, and which removes the transmission light or the reception light moving in a predetermined direction;

a reflector assembly the which has an empty space to assemble transmission and reception module at a side, and which receives the transmission light from the transmission and reception module to reflect the transmission light toward the object, and which transmits the reception light reflected from the object to the transmission and reception module;

a rotary module which is connected to a lower portion of the transmission and reception module, and which generates a torque to be implemented to be rotatable; and a fixing module which supports the transmission and reception module and the rotary module, wherein the transmission and reception module includes:

a first body tube which provides a path through which the transmission light moves and is assembled with a transmission lens on a front surface of the first body tube;

a second body tube which is spaced apart from the first body tube, provides a path through which the reception light moves, and is assembled with a reception lens on a front surface of the second body tube;

a circuit board which is assembled on rear surfaces of the first body tube and the second body tube, which includes a light source for transmitting the transmission light and which processes the reception light to acquire distance information to the object; and a baffle which is assembled on a side surface of the first body tube and the second body tube and cancels a noise due to the transmission light and the reception light, wherein the baffle includes:

a light transmission baffle which is assembled on the first body tube and which has at least one groove through which the transmission light passes;

a light reception baffle which is assembled on the second body tube and has at least one groove through which the reception light passes, wherein the baffle is slidably assembled in assembly grooves formed on lower side surfaces of the first body tube and the second body tube.

\* \* \* \* \*